Nov. 27, 1951 W. L. BENNINGHOFF ET AL 2,576,095
MACHINE TOOL
Filed Feb. 26, 1945 13 Sheets-Sheet 1

INVENTORS
W. L. Benninghoff
A. F. Robertson
BY
Ray S. Gehr ATTORNEY

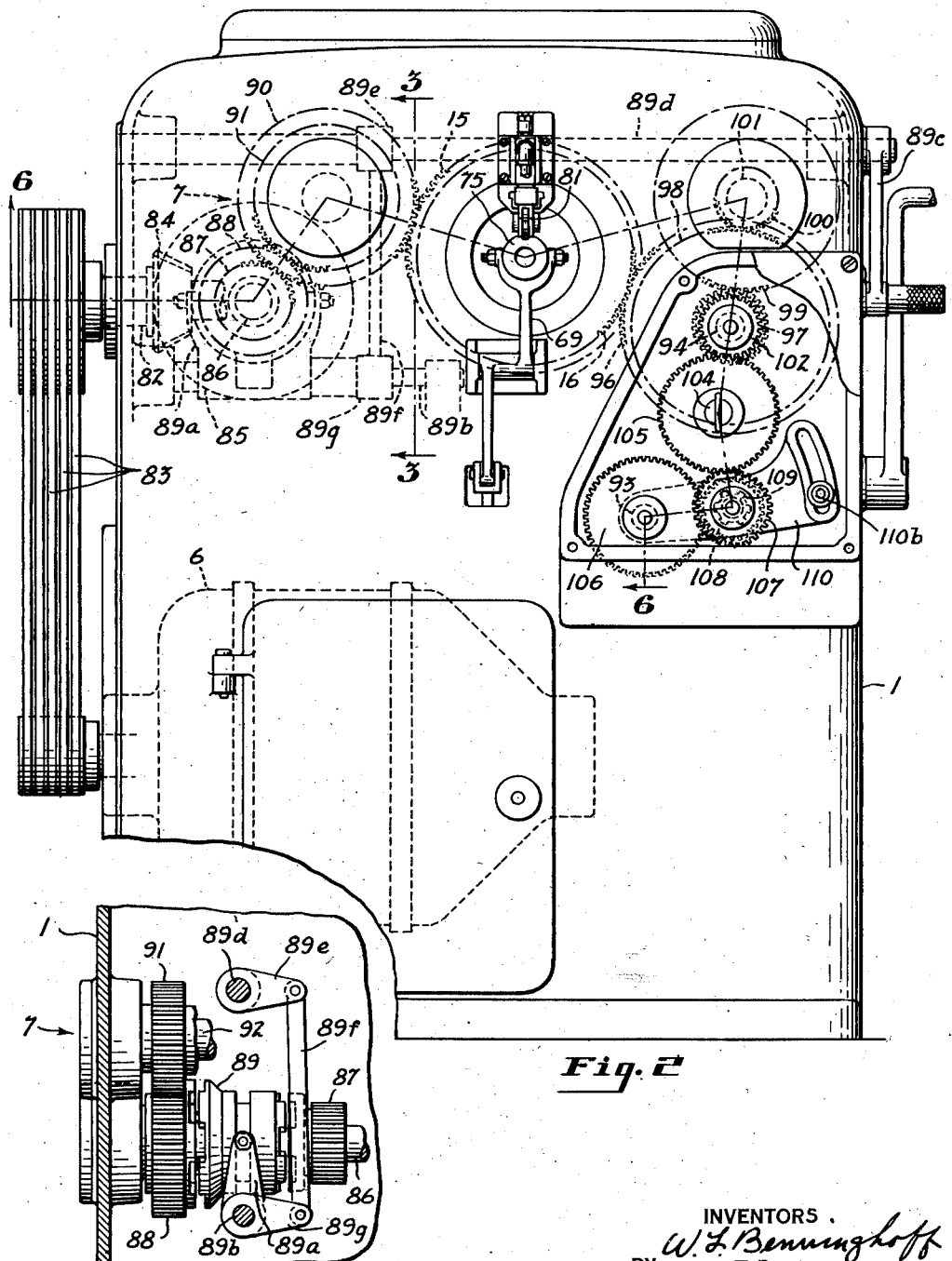

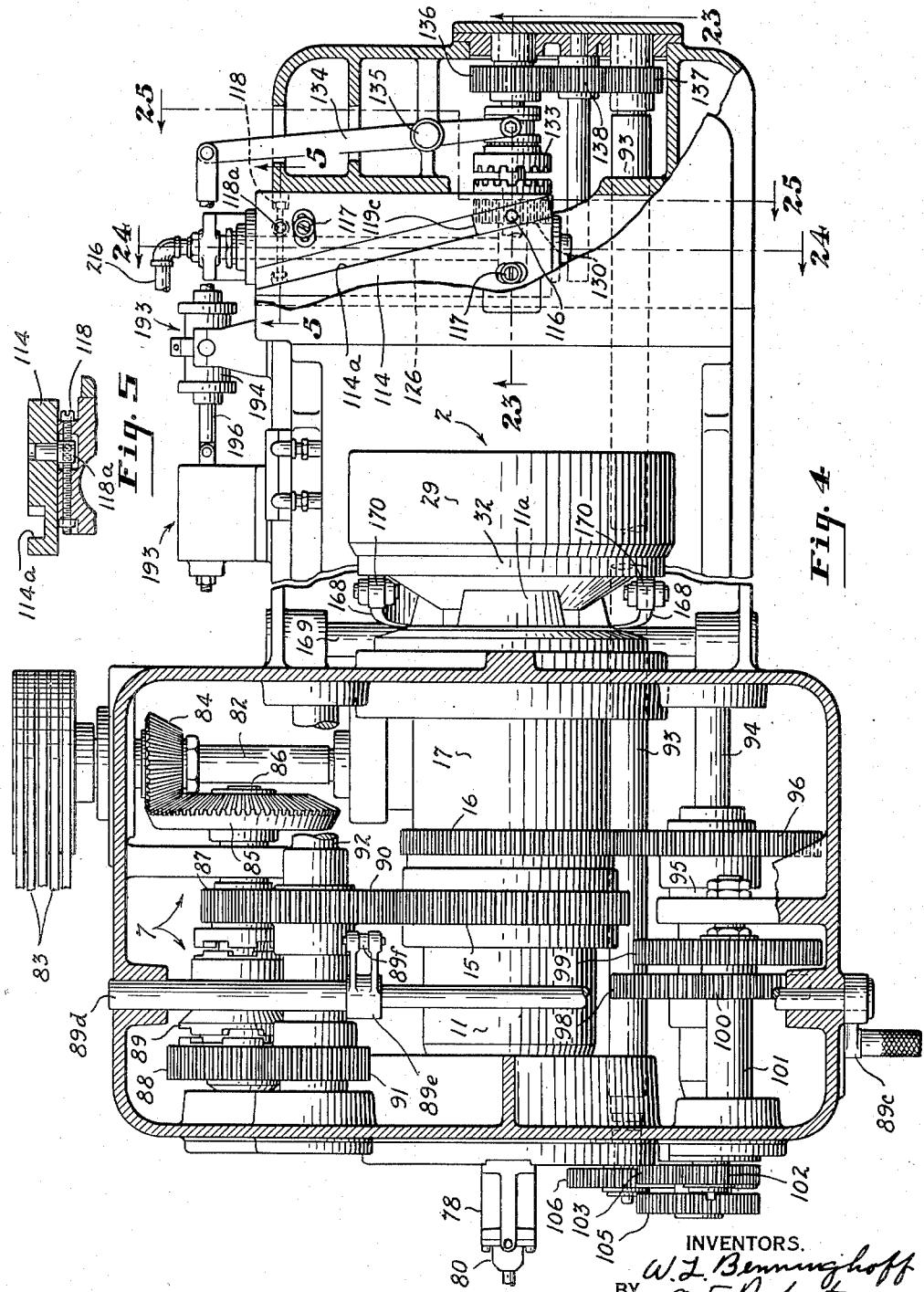

Nov. 27, 1951     W. L. BENNINGHOFF ET AL     2,576,095
MACHINE TOOL
Filed Feb. 26, 1945                                    13 Sheets—Sheet 5
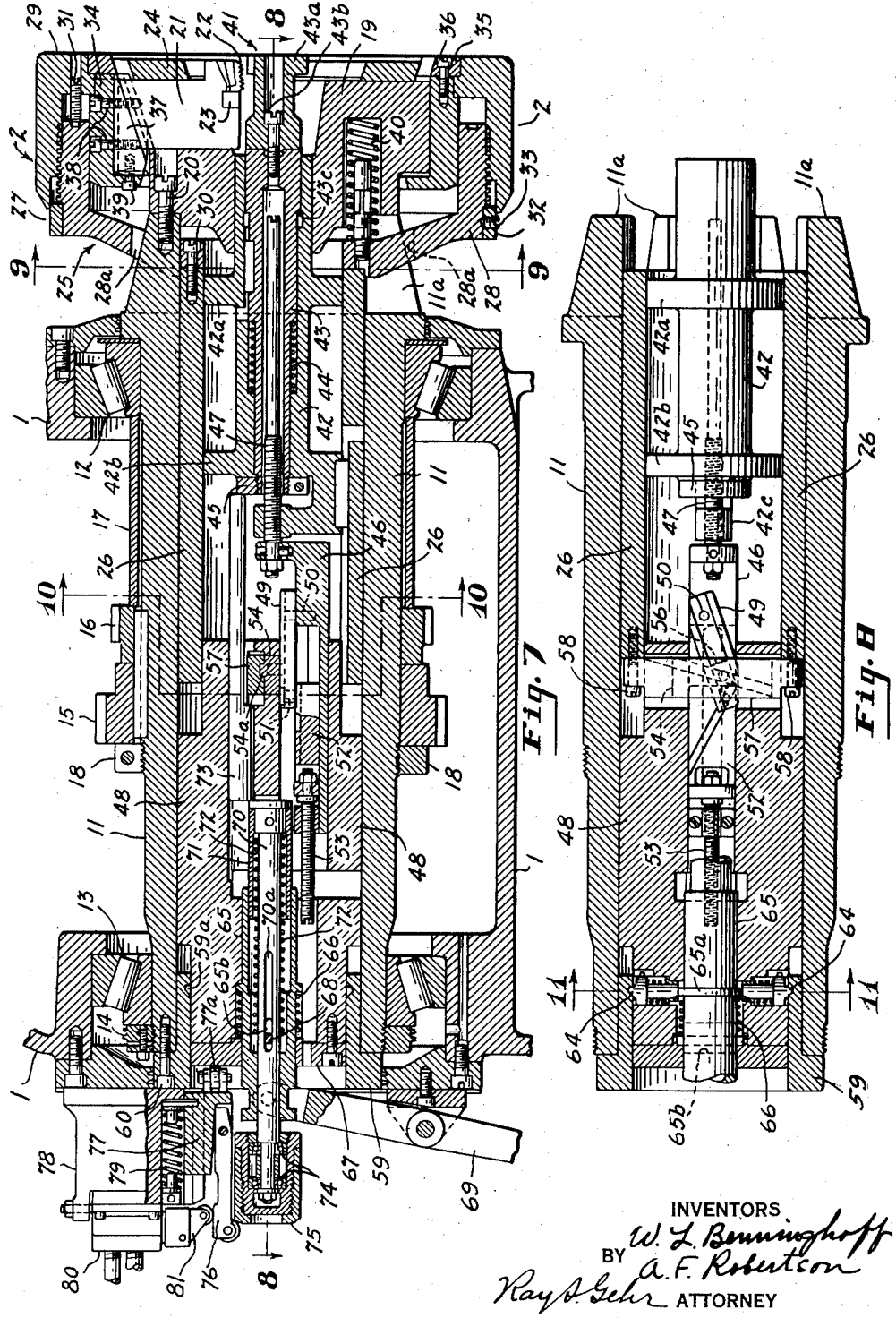
INVENTORS
W. L. Benninghoff
A. F. Robertson
BY
Ray A. Gehr ATTORNEY

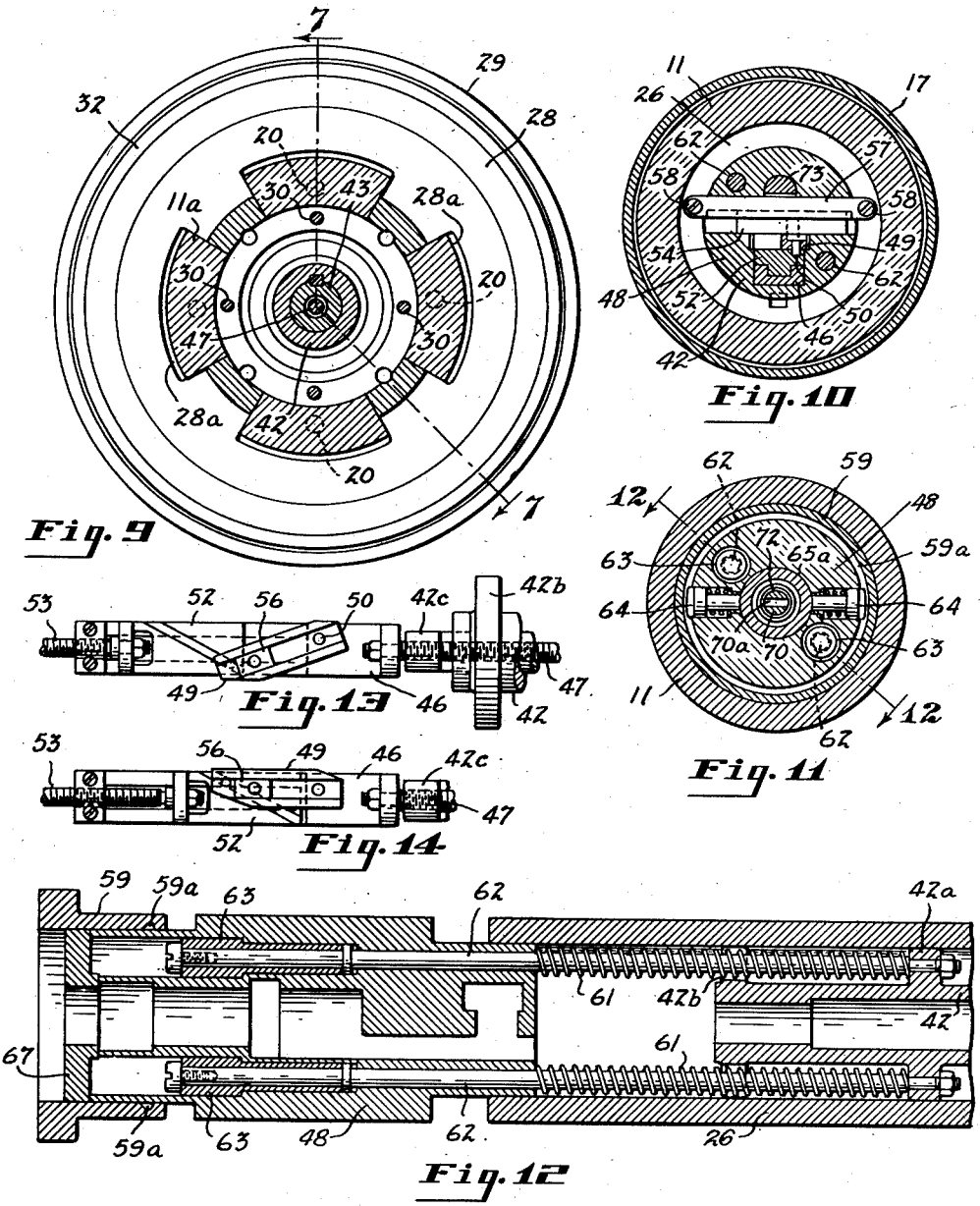

INVENTORS.
W. L. Benninghoff
A. F. Robertson
BY
ATTORNEY

Nov. 27, 1951     W. L. BENNINGHOFF ET AL     2,576,095
MACHINE TOOL
Filed Feb. 26, 1945     13 Sheets-Sheet 8

INVENTORS
W. L. Benninghoff
A. F. Robertson
BY Ray S. Gehr ATTORNEY

Nov. 27, 1951  W. L. BENNINGHOFF ET AL  2,576,095
MACHINE TOOL

Filed Feb. 26, 1945  13 Sheets-Sheet 9

INVENTORS.
W. L. Benninghoff
BY A. F. Robertson
Ray S. Gehr ATTORNEY

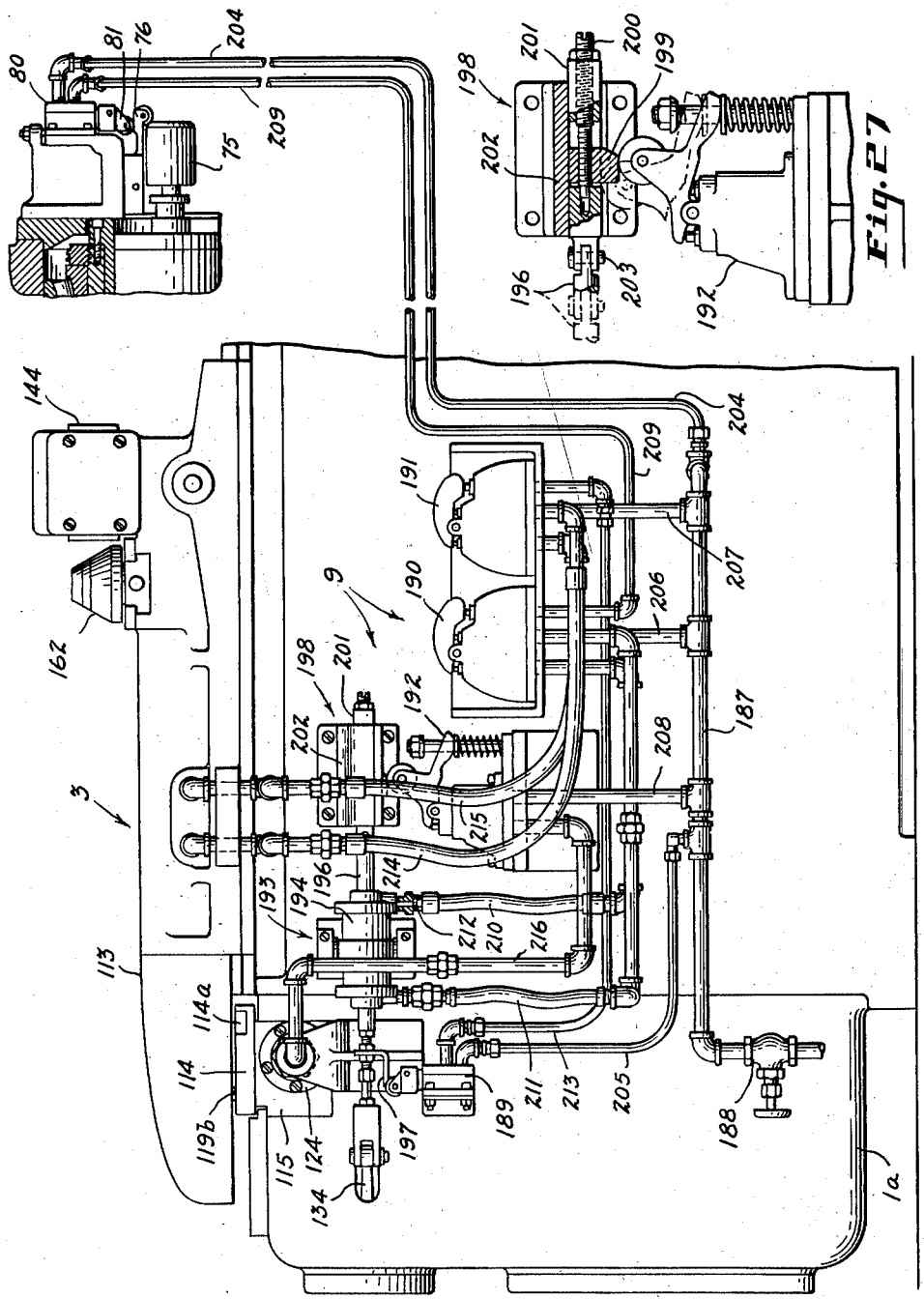

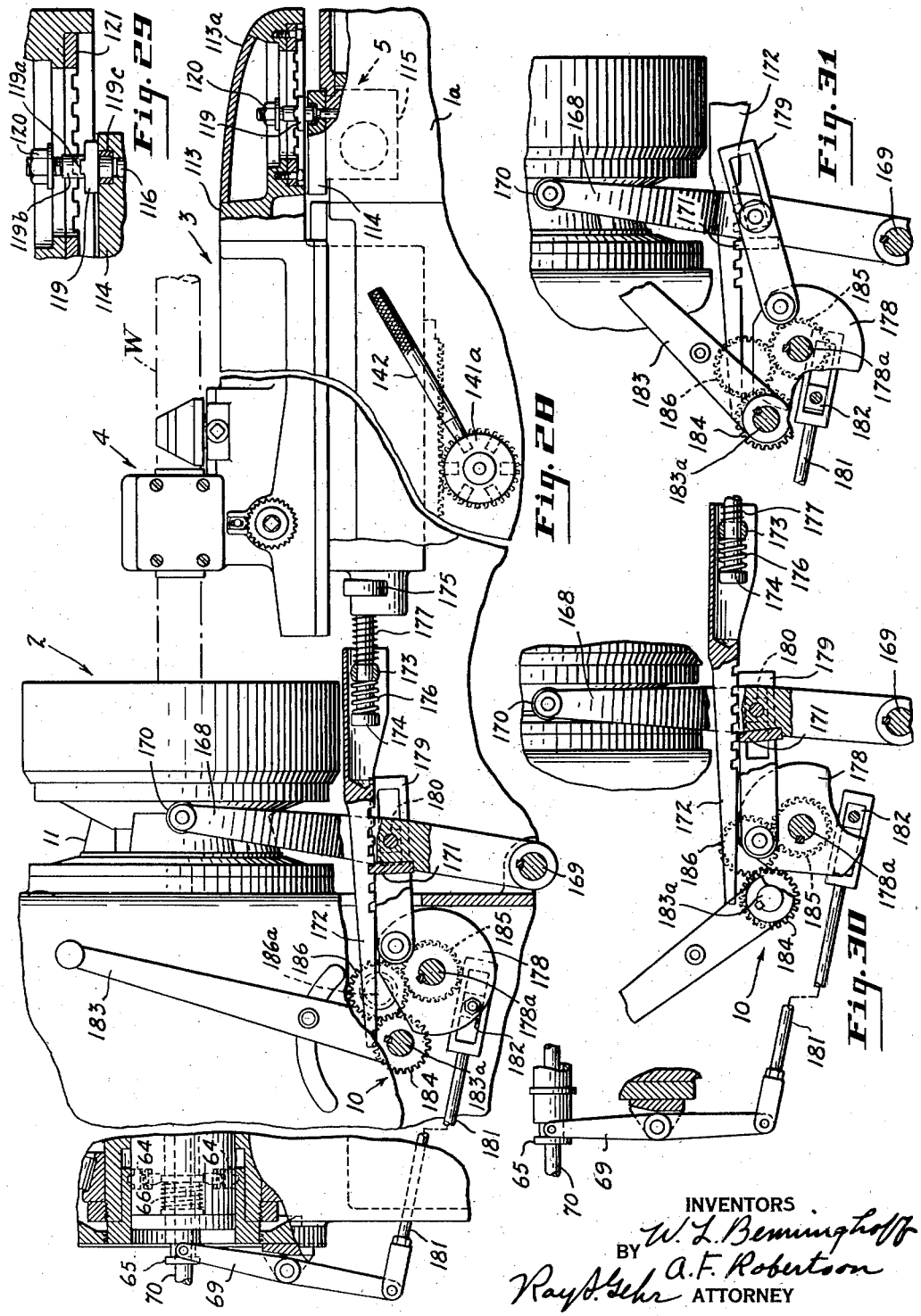

Nov. 27, 1951  W. L. BENNINGHOFF ET AL  2,576,095
MACHINE TOOL
Filed Feb. 26, 1945  13 Sheets-Sheet 13
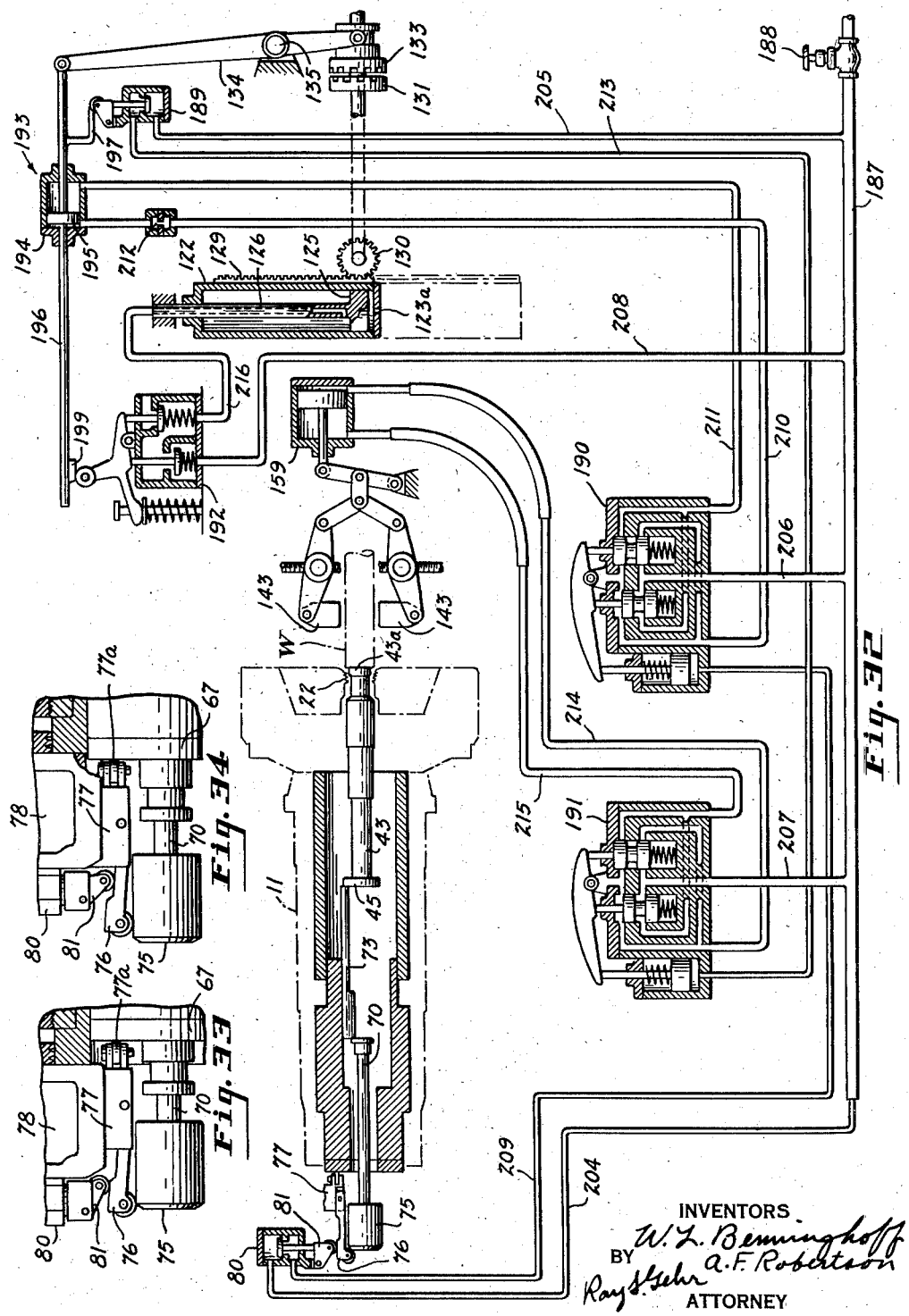
INVENTORS
W. L. Benninghoff
A. F. Robertson
BY Ray S. Gehr
ATTORNEY Patented Nov. 27, 1951

2,576,095

UNITED STATES PATENT OFFICE 2,576,095

MACHINE TOOL

William L. Benninghoff, Waite Hill Village, and Alexander F. Robertson, South Euclid, Ohio, assignors to The Pipe Machinery Company, Cleveland, Ohio, a corporation of Ohio Application February 26, 1945, Serial No. 579,752

22 Claims. (Cl. 10—96)

The invention relates to machine tools and particularly to tools for cutting screw threads, including taper threads. The invention is applicable to the cutting of both exterior and interior threads, but for purposes of explanation it will be shown as embodied in apparatus designed for the cutting of external threads.

It is a principal object of the invention to provide a machine for cutting screw threads that is largely automatic in operation and capable of performing rapid, yet uniform and reliable, operations upon work pieces fed to it in succession, with resultant large capacity for the turning out of work of high quality.

The invention has for another of its objects the provision in a thread-cutting machine of the type having thread-forming apparatus with collapsible chasers, a work chuck, means for effecting relative rotation of the said apparatus and chuck and means for effecting their relative axial movement, first toward and then away from each other, of means operating automatically in succession to close the chuck upon a work piece presented to the chasers, effect to slow forward feed of the work piece in relation to the chasers, a rapid retraction of the work piece from the chasers and opening of the chuck to release the work piece.

A further object of the invention is to provide a machine for attaining the above stated objects having control and actuating devices energized by fluid pressure with resultant attainment of high speed movements for various parts of the mechanism preparatory to and following the actual thread-cutting operation, with resultant attainment of a short over-all time of the operating cycle.

Another object of the invention is to provide thread-cutting apparatus of the receding-chaser type in which the chasers are movably mounted in one end of a hollow rotary spindle and are actuated by means supported from interior surfaces of the spindle while the spindle itself is rotatably supported by exterior bearings one of which is close to the chasers for firm support thereof.

The invention has for another object the provision of thread-cutting apparatus of the receding and collapsing chaser type in which the chasers are mounted on a rotary spindle and have their actuating mechanism constructed and arranged within the spindle so that it is possible both to secure great compactness and dust-proof enclosure for the mechanism and at the same time to provide adequate bearing support for the spindle relatively close to the chasers so as to attain firmness of support for the chasers and the advantages resulting from such support.

Another object of the invention is to provide a rotary spindle thread-cutting apparatus of the character above indicated having improved means by which the apparatus can conveniently be adjusted to cut threads of various tapers.

A further object of the invention is to provide thread-cutting apparatus of the receding chaser type having improved means for varying the diameters of the thread cut.

The invention has for another of its objects the provision, in a metal-working machine comprising a cutter mechanism, a work-holding mechanism and a feed carriage for supporting one of said mechanisms, of means for moving the carriage comprising a drive cam, variable speed gearing for moving the cam to effect carriage feed movement during the cutting operation of the machine, and fluid pressure operated means for moving the cam in the reverse direction independently of said gearing to effect a rapid return movement of the carriage.

Another object of the invention is to provide a machine of the character referred to in the last stated object in which the cutter mechanism is adapted to form screw threads and in which the feed cam is adjustable to compensate for errors of lead that might otherwise occur in the thread cut by the machine.

Another object of the invention is to provide a machine such as referred to in the last but one of the foregoing objects in which the cutter mechanism is adapted to form screw threads and in which the connection between the feed carriage and its actuating cam is adjustable to provide for cutting threads of different lengths while permitting support for the work relatively close to the cutters.

The invention has for another of its objects the provision in a metal-working machine comprising a thread-cutting mechanism, a work-holding mechanism and a feed carriage for supporting one of said mechanisms, of feed mechanism for the carriage comprising a drive cam, and readily disengageable connecting means between the cam devices and the carriage to permit the latter to be moved back away from the thread-cutting mechanism and afford access thereto.

A further object of the invention is the provision, in a thread-cutting machine in which work to be threaded is held by a fluid actuated chuck supported by a feed carriage and the operation of the carriage and chuck are automatically controlled, of improved means for timing the action of the chuck in relation to the movement of the carriage.

The invention has for still another object the provision, in a thread-cutting apparatus of the type in which the cutters slowly recede during their cutting operation, rapidly collapse at the end of their cutting operation and are automatically re-set for the start of a succeeding cutting operation, of improved means for manually disconnecting the automatic re-setting means, effecting collapse of the cutters, re-setting the cutters and restoring the operation of the automatic re-setting means.

The invention has various other objects, more or less incidental or ancillary to those above noted, which will appear in the following description of an exemplary embodiment of our improvements shown in the accompanying drawings.

With all of the various objects in view the invention consists in features of construction and combination of parts to be explained in the following detailed description having reference to the accompanying drawings and will be particularly pointed out in the appended claims.

In the drawings,

Fig. 1 is a front elevation of a machine embodying the invention, it being designed to cut external taper threads on pipes, rods and the like.

Fig. 2 is an enlarged elevation of the left end of the machine with a portion thereof broken away to permit of the large scale showing and with one of the cover plates of the machine removed to better show a portion of its drive gearing.

Fig. 3 is a fragmentary section taken on the line 3—3 of Fig. 2 showing in elevation a portion of the power transmitting gearing of the machine.

Fig. 4 is an enlarged plan view of the machine with a middle portion thereof broken away, with the top part of the machine casing cut away to reveal the horizontally disposed spindle of the thread-forming apparatus, the gearing for driving the same and the gearing by which the said spindle is operatively connected to drive the carriage feed mechanism which is shown at the right end of the figure where the machine casing is partially broken away.

Fig. 5 is a fragmentary vertical section on the line 5—5 of Fig. 4 showing means for adjusting the carriage-actuating cam.

Figure 6:
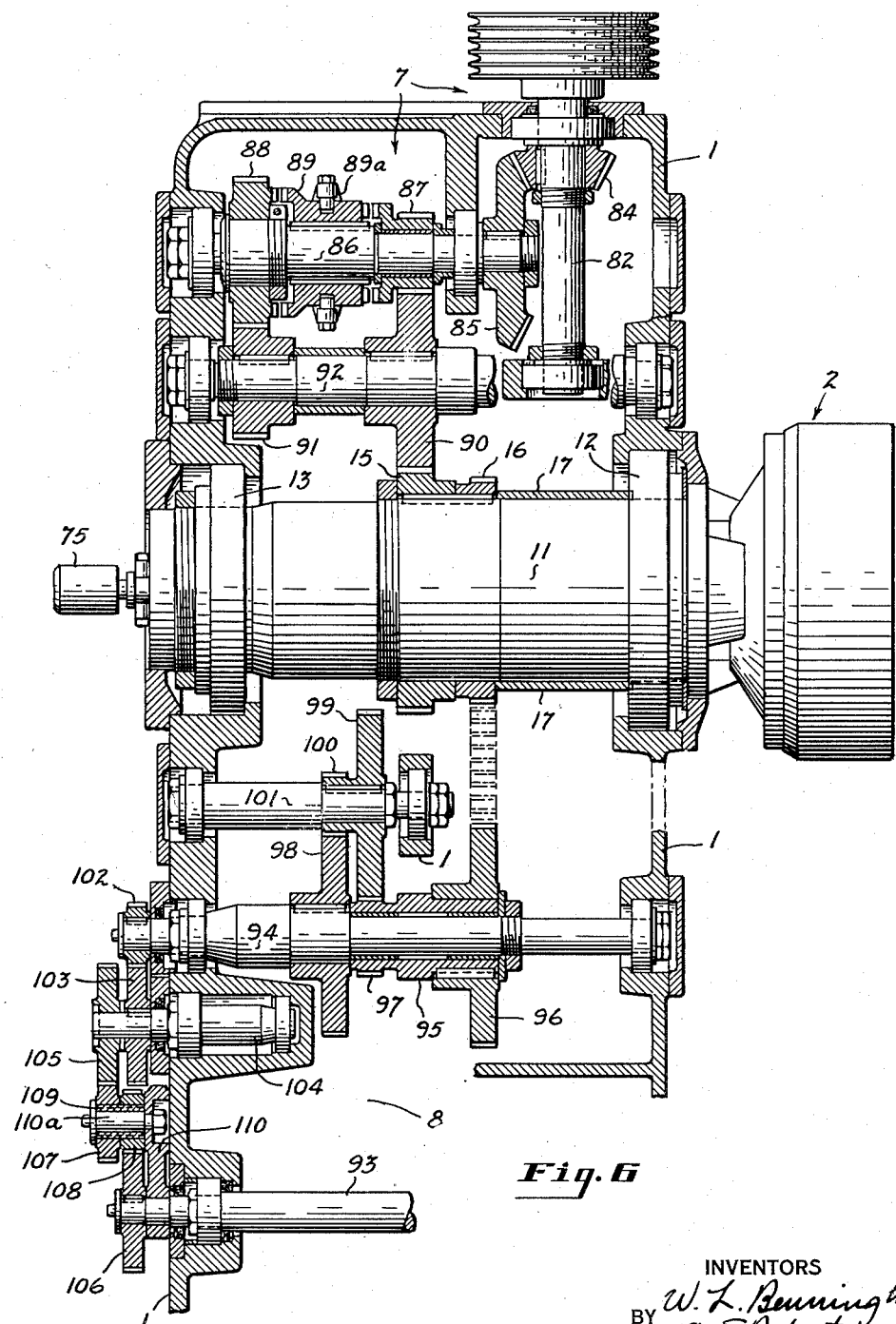

Fig. 6 is a developmental sectional view taken on the broken line 6—6 of Fig. 2 and showing the major part of the drive gearing at the left end of the machine.

Fig. 7 is an enlarged longitudinal sectional view of the thread-forming apparatus, the section being taken on the line 7—7 of Fig. 9.

Fig. 8 is a horizontal axial section showing the main parts of the thread-forming mechanism shown in Fig. 7.

Fig. 9 is a vertical transverse section on the line 9—9 of Fig. 7.

Fig. 10 is a transverse section on the line 10—10 of Fig. 7.

Fig. 11 is a transverse section on the line 11—11 of Fig. 8.

Fig. 12 is a fragmentary longitudinal section on the line 12—12 of Fig. 11.

Figs. 13 and 14 are fragmentary detail views showing the adjustable cam device of the thread-cutting mechanism which determines the taper of the thread cut, Fig. 13 showing the cam device set for cutting a taper thread, while Fig. 14 shows it set for the cutting of a straight thread.

Figure 15:
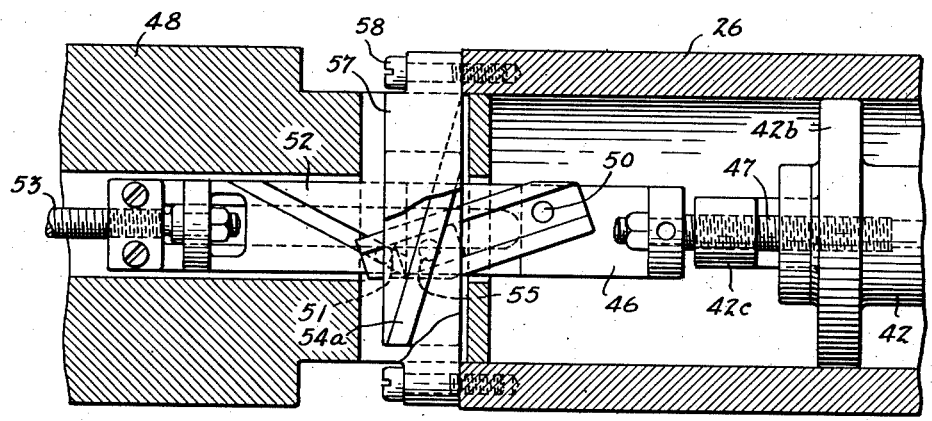

Fig. 15 is an enlarged reproduction of the middle part of Fig. 8 to better show the construction of cam mechanism employed for causing gradual retraction of the cutters.

Figure 16:
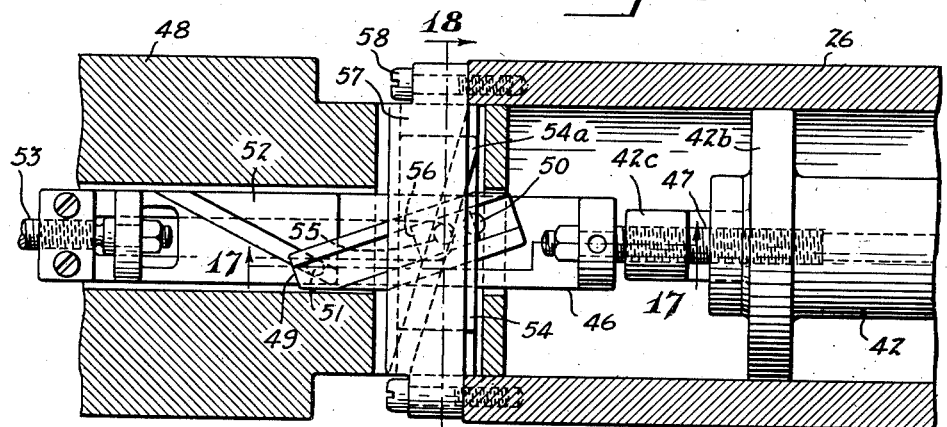

Fig. 16 is a view similar to Fig. 15 but showing the movable parts in the positions occupied after some retraction of the cutters has been effected.

Figure 17:
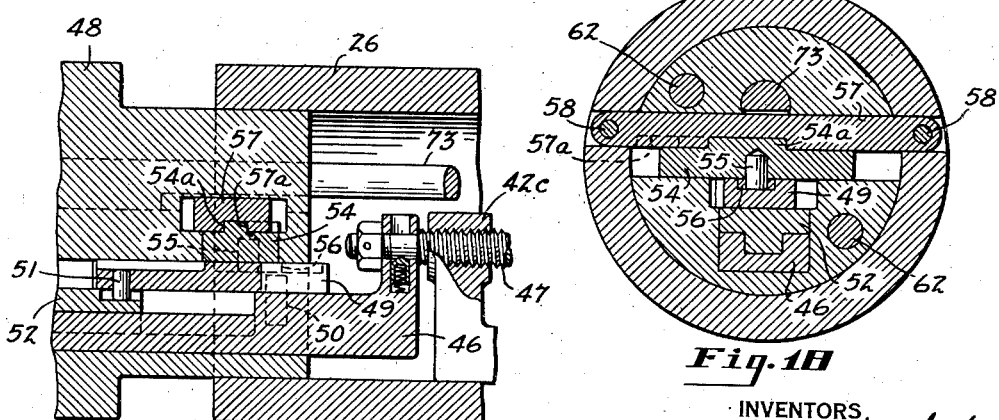

Fig. 17 is a longitudinal section on the line 17—17 of Fig. 16.

Figure 18:
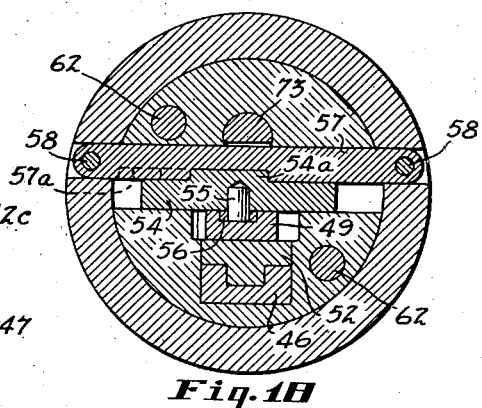

Fig. 18 is a transverse section on the line 18—18 of Fig. 16.

Figure 19:
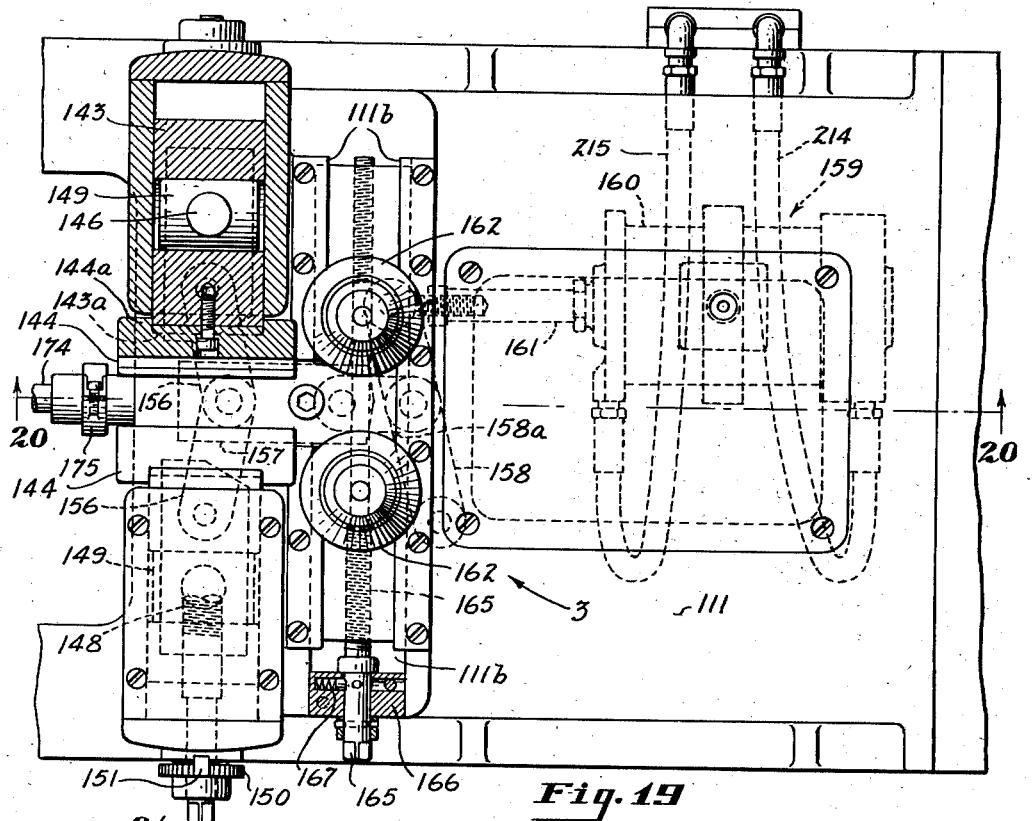

Fig. 19 is an enlarged fragmentary plan view of a portion of the machine carriage and the work chuck or gripper mechanism with some of the parts broken away and shown in section.

Figure 20:
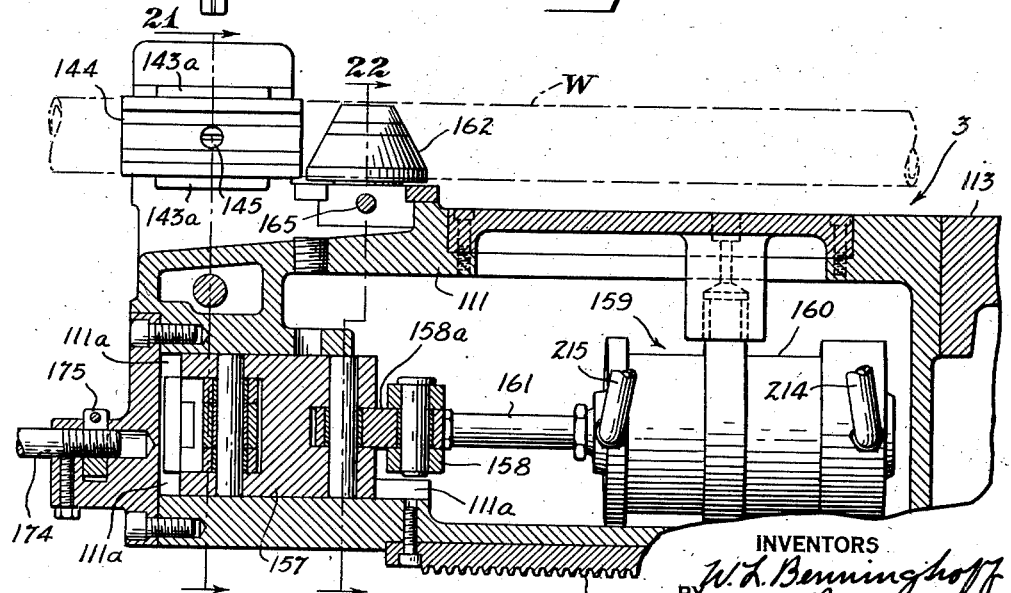

Fig. 20 is a vertical section on the line 20—20 of Fig. 19.

Figure 21:
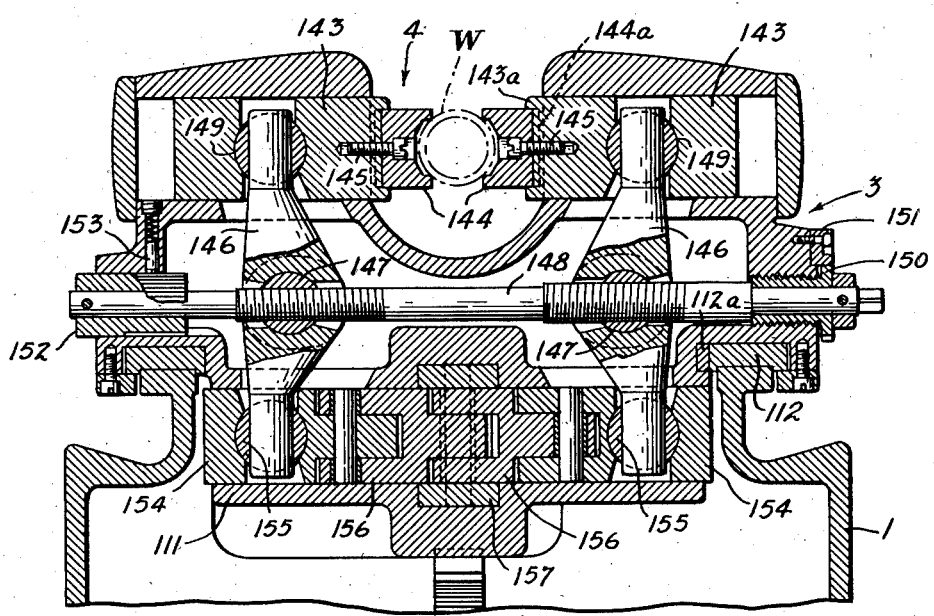

Fig. 21 is a vertical section on the line 21—21 of Fig. 20.

Figure 22:
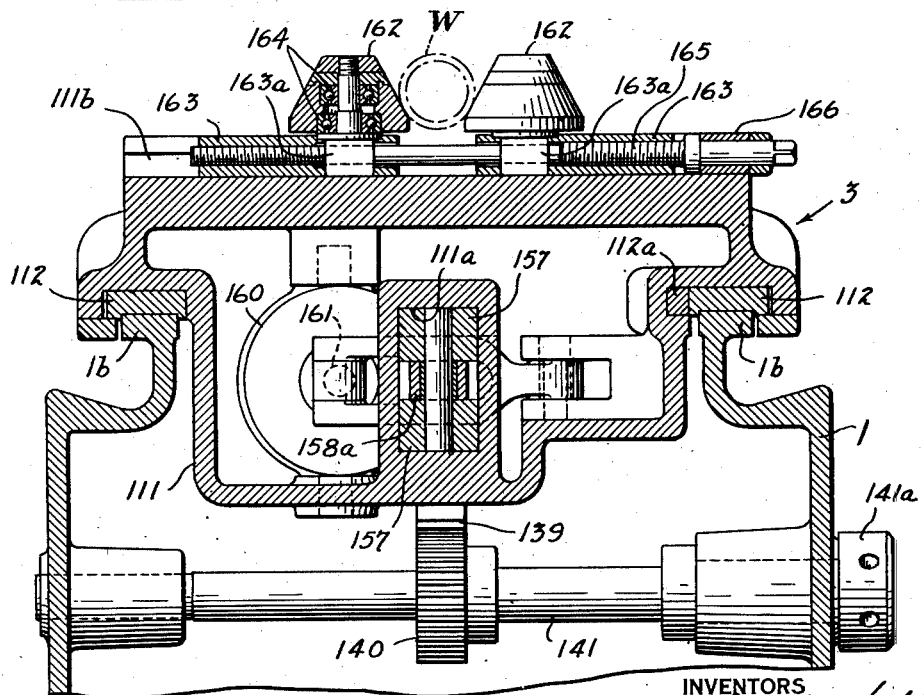

Fig. 22 is a vertical section on the line 22—22 of Fig. 20.

Figure 23:
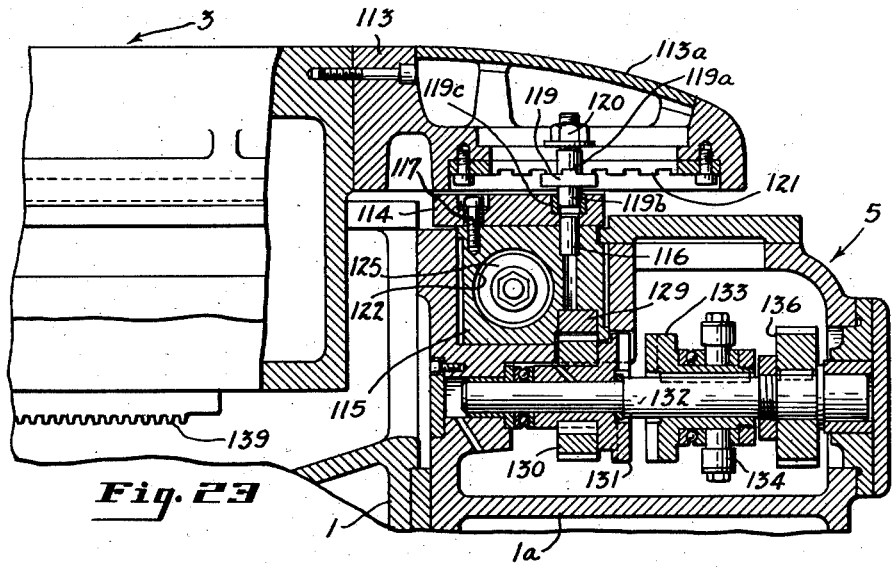

Fig. 23 is an enlarged fragmentary vertical section taken on the line 23—23 of Fig. 4 and illustrating a portion of the carriage feed mechanism.

Figure 24:
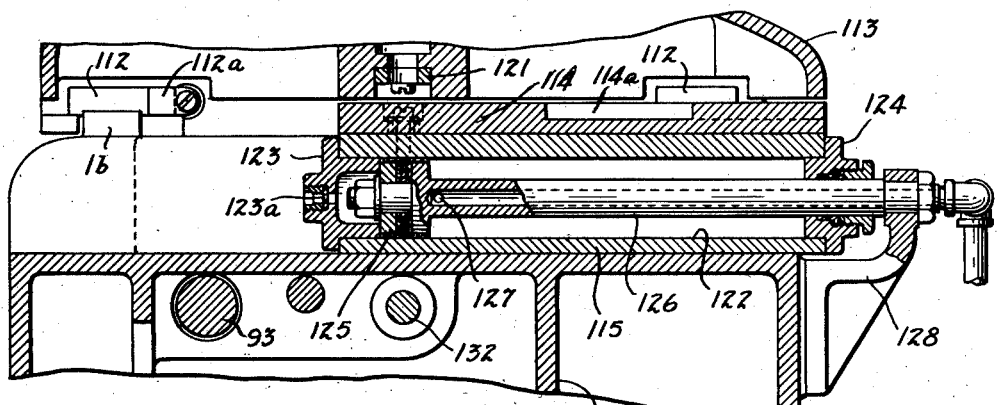

Fig. 24 is an enlarged fragmentary transverse section of the machine taken on the line 24—24 of Fig. 4.

Figure 25:
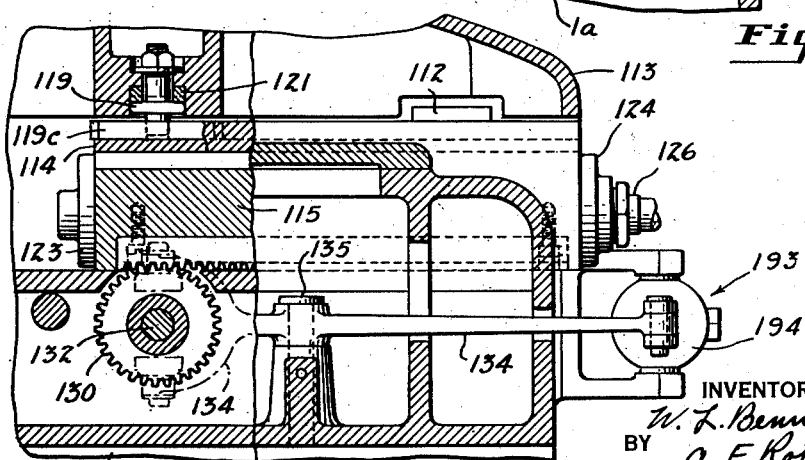

Fig. 25 is an enlarged fragmentary section taken on the broken line 25—25 of Fig. 4.

Fig. 26 is an enlarged rear elevation of a portion of the machine with a considerable part thereof broken away to permit larger scale illustration of fluid pressure control and actuating devices of the machine.

Fig. 27 is an enlarged detail view of one of the valves of the machine and the cam means for actuating it.

Fig. 28 is a large scale front elevation of portions of the machine, with some parts shown in section, to illustrate the automatic devices for re-setting the thread-forming chasers following their collapse at the end of the thread-cutting operation, together with manual devices for disconnecting the automatic re-setting means and effecting manual collapse and re-setting of the cutters.

Fig. 29 is a fragmentary vertical section showing the adjustable connection between the machine carriage and the cam feed device with the said connection broken to permit independent movement of the carriage.

Figs. 30 and 31 are fragmentary detail views of the manual collapse and re-setting devices showing them in positions of operation different from the positions shown in Fig. 28.

Fig. 32 is a diagrammatic view of the fluid-pressure-actuated devices of the machine together with their control devices.

Figs. 33 and 34 are fragmentary side elevations showing one of the pilot valves and its actuating cam in different positions in the cycle of operations.

Speaking generally, the machine shown in the drawings comprises a main floor-supported frame or casing structure designated as an entirety by the numeral 1. This frame has at its right end a bolted-on extension 1a. At the left or head end of the machine, as viewed from the front, is disposed thread-cutting apparatus with means for automatically effecting receding and collapsing movements of the chasers, this apparatus being designated as an entirety by the numeral 2. 3 designates as an entirety a work carriage slidably mounted on ways on the frame 1; and 4 designates as an entirety a work-holding gripper or chuck mechanism for which the carriage structure serves as a supporting frame. A combined fluid and gear operated feed mechanism for advancing and retracting the machine carriage is designated as an entirety by the numeral 5 and is best shown in Figs. 4, 23-25. The numeral 6 designates an electric motor for driving the mechanical parts of the machine, the motor being operatively connected with the spindle of the thread-cutting apparatus by a variable speed drive mechanism designated as an entirety by 7, while the numeral 8 designates as an entirety a variable speed gear drive mechanism between the said spindle and the carriage feed mechanism 5.

The machine further comprises a system of fluid actuated devices for operating and coordinating the movements of various parts and devices of the machine, and this system is designated as an entirety by 9 (Fig. 26). The machine is provided also with a manually operable mechanism, designated as an entirety by the numeral 10, for collapsing and re-setting the chasers of the thread-cutting apparatus independently of the automatic control of the machine.

The above noted main portions of the machine will now be described in detail.

The thread-cutting apparatus

As has been stated, the machine shown by way of example in the application drawings is designed to form external screw threads and for brevity and convenience the thread-forming apparatus 2 will be referred to as the die, with the understanding that the latter term is not used in a limiting sense.

The die mechanism has a tool body in the form of a hollow spindle which comprises a main part or body 11 rotatably mounted at its right and left ends in roller bearings 12 and 13, respectively. A ring nut 14 is provided to afford adjustment for both of the bearings. Keyed on spindle body 11 are driven and driving gears 15 and 16, respectively, which are secured against axial movement by a spacer sleeve 17 and ring nut 18. In addition to the spindle body 11, the tool body or spindle comprises a head 19 secured to body 11 by screws 20. The spindle body 11 is formed at its front end with four forward extensions or fingers 11a to which head 19 is rigidly secured by the screws 20. The spaces between adjacent fingers thus provide four openings through the side wall of the spindle.

The head 19 is formed with a plurality of radial slots in each of which is slidably mounted a chaser block 21 which carries at its inner end a chaser 22 secured by wedge block 23. The blocks 21 are slidably secured in their slots by an annular plate or ring 24 which is secured by screws (not shown) to the head 19.

The chaser blocks and their mounting in the head of the tool body are of well known construction such as is shown in the United States patent to Benninghoff, No. 2,054,028 (Fig. 13), each block being provided with a pair of coil springs which urge the block radially outward in its guide slot. As the present invention is not concerned with these details they are not fully shown and need not be further described.

The die is provided with a chaser-actuating slide which is designated as an entirety by the numeral 25 and which will generally be referred to in the following description as the outer slide. This outer slide 25 comprises a tubular body 26 slidably mounted in the spindle body 11 and a head structure 27 comprising a fixed member 28 of annular flanged form and an annular flanged member 29 having screw threaded engagement with the member 28 to permit axial adjustment of said member 29. The head member 28 is formed with four apertures 28a through which extend the fingers 11a of the spindle body 11 and at points radially inside of these fingers member 28 is rigidly secured by screws 30 to the tubular member 26 of the slide. The fingers 11a by their engagement with apertures 28a key the slide structure 25 against rotation relative to spindle body 11. A plurality of set screws 31 mounted in head member 29 to engage member 28 serve to hold the member 29 in adjusted position on member 28. A ring 32 having graduations on its peripheral surface is secured on the periphery of the member 28 of the outer slide and suitable reference marking is provided on the adjacent edge of the adjustable member 29 to cooperate with the graduations on member 32 and facilitate the adjustment of member 29 for purposes which will later be explained. A set screw 33 serves to adjustably secure ring 32.

To effect the receding movements of the chaser blocks 21 and chasers 22 a cam ring 34 is secured to the member 29 of the outer slide, by a retaining ring 35 and screws 36, so that the ring 34 slidably engages the inner surface of the member 28. To the ring 34 a plurality of cam blocks 37 are secured by screws 38, 39 in position to operatively engage the chaser blocks 21, the chaser blocks and cam blocks being provided with interlocking tongue and groove cam surfaces in well known manner, which also is disclosed in the above mentioned Patent 2,054,028. With the parts constructed as described, movement of the outer slide and the cam blocks 37 to the left serves to withdraw the chaser blocks outward to effect their receding movement to produce a taper thread.

In addition to the springs, not shown but above referred to as interposed between the head 19 and the chaser blocks 21 to urge the latter radially outward, a plurality of springs 40 are interposed between the head 19 and member 28 of the outer slide, these latter springs tending to urge the outer slide to the left and thus serving to assist the outward movement of chaser blocks 21 during the receding movement thereof.

Within the outer slide 25 is mounted an inner slide structure designated as an entirety by the numeral 41. This inner slide comprises a main member 42 having flanges 42a and 42b with cylindrical peripheral surfaces that slidably engage the cylindrical interior surface of outer slide member 26. The slide member 42 is formed with an axial bore within which is mounted a work-engaging structure 43 which comprises a work-engaging pressure pad 43a detachably secured to the main body of structure 43 by screw 43b. The structure 43 is urged to the right in relation to the inner slide member 42 by a coil spring 44 but such movement to the right is limited by nut 45 on the left end of structure 43. Movement of the structure 43 toward the left in relation to member 42 is limited by engagement of shoulder 43c with an opposing shoulder on member 42.

The parts 42 and 43 are keyed together as shown (Fig. 9) to prevent their relative rotation.

To the left of the inner slide member 42 is another member 46 of the inner slide structure. This latter member is adjustably secured to member 42 by a screw 47 which rotatably engages member 46 and has threaded engagement with an upstanding finger 42c of member 42. The screw 47 can be adjusted in member 42 by removing the pressure pad 43a to permit the insertion of a slender tool to turn the screw.

The slide member 46 is slidably supported in a cylindrical abutment block 48 which itself fits slidably in the bore of spindle 11 but is normally secured against sliding movement therein by means which will later be described. 49 is a cam bar pivotally mounted at its right end on a pin 50 carried by slide member 46 (Figs. 7 and 17). At its left end cam 49 carries a depending pin 51 which engages the cam slot of a cam 52 mounted in member 46 for a guided sliding movement parallel to the axis of the die. Cam block 52 is adjustably connected by screw 53 to slide member 46. By inserting a screw driver or other suitable tool in the left end of the die, screw 53 can be turned to adjust cam block 52 to the right or to the left and thereby swing the cam block 49 about pivot pin 50 to vary the inclination of the cam groove of block 49 to the longitudinal axis of the die. Such adjustment of cam 49 is illustrated in Figs. 13 and 14.

Above the cam 49 is another cam 54 slidably mounted and guided in the abutment 48 for movement at right angles to the die axis. This cam member 54 has a depending pin which engages a slide block 56 in the cam groove of cam block 49 (Fig. 18), so that the movement of cam 49 with the inner slide effects transverse movement of cam 54. Cam 54 is formed with a tongue 54a which in turn engages a cam groove 57a in the transverse bar 57 which is secured to the left end of the outer slide structure by means of screws 58, 58.

By means of the several cam members last described, one of which (54), it will be recalled, is anchored in the abutment member 48, longitudinal movement of the inner slide structure 41 is transmitted on a reduced scale to the outer slide structure 25 while the movement of the latter is in turn transmitted through a further reduction to the chaser blocks 21. Provision is thus made for the relatively small receding movement of the chasers which is effected during the threading operation in the cutting of taper threads. By adjusting the cam block 49 on its pivot, as above described, the degree of taper of the thread cut can be varied from a maximum corresponding to the adjustment shown in Fig. 13 to the minimum of the adjustment shown in Fig. 14 where the movement transmitted by cam 49 is nil and a straight thread is cut.

A flanged sleeve 59 is secured by screws 60 in the left end of spindle body 11 and the right end of this sleeve serves as a stop limiting movement toward the left of abutment 48. Pressure tending to move said abutment toward the left is constantly exerted upon it by a pair of coil springs 61, 61 (Fig. 12) which are interposed between the abutment and flange 42a of the inner slide member 42. These springs are supported on rods 62, 62 which are secured to the flange 42a and slidably engage the abutment 48. At their left ends the rods 62 carry pistons 63 which serve with the cylindrical chambers in which they work, as air dash-pots.

The abutment 48 is normally secured against movement in the spindle body 11 by a pair of diametrically opposite spring mounted latches 64, 64 which have bevelled outer ends engaging a latch groove 59a in the sleeve 59. Normally these latches are positively held in locking engagement with sleeve 59 by means of a detent member in the form of sleeve 65 which is formed with a collar 65a that is peripherally flatted at diametrically opposite points to engage the flat inner ends of the latches, as shown in Fig. 8. The sleeve 65 is yieldingly pressed toward the right by coil spring 66 which is interposed between the collar 65a of the sleeve and a circular plate or disc 67 which is removably secured to the left end of abutment 48. The walls of sleeve 65 are formed with diametrically opposite slots 65b through which extends a transverse pin 68 the two ends of which are anchored in notches in the annular central boss of the end plate 67 of abutment 48. The purpose of the pin will presently appear.

At its left end the detent sleeve 65 is circumferentially grooved to cooperate with the end of a manually operated lever 69 by means of which sleeve 65 can be shifted to the left against the tension of spring 66, in order to release the latches 64 so that the pressure of the abutment 48 under the urging of springs 61 will cause the disengagement of the latches and permit the abutment to move toward the left in the spindle body 11. When such movement, which is rapid, occurs the pistons 63 cushion the movement and prevent undue shock.

A rod or spindle 70 is disposed within the sleeve 65 for longitudinal movement therein, the rod having direct sliding engagement with the sleeve at its left end and having its enlarged right end fitted with a sleeve 71 which slidably engages the right end of sleeve 65. The transverse pin 68 extends through an elongated slot 70a in the rod 70 so that the latter can move endwise without interference with the pin. The rod 70 is normally urged toward the right by coil spring 72 which at one end engages the large right end of rod 70 and at its other end engages the pin 68, the latter thus serving as an abutment for the spring.

An elongated rod 73 is slidably mounted in the abutment 48 and is disposed parallel to the axis of the die with its left end engaging the right end of rod 70 and with its other end engaging the nut 45 of the work engaging slide member 43 so as to transmit movement toward the left of member 43 to rod 70. At its left end the rod or spindle 70 is fitted with a pair of ball bearings 74 upon which is rotatably mounted a cylindrical cam 75. This cam is arranged to cooperate with a lever 76 pivotally mounted on a block 77 which is itself slidably mounted on a bracket 78 secured to the main frame of the machine. A coil spring 79 interposed between the bracket 78 and the block 77 urges said block toward the right. At its right end the block is fitted with an anti-friction roller 77a disposed to engage the end plate 67 of abutment 48. The lever 76 is fitted at its free end with an anti-friction roller to engage the cam 75 and on its upper side the lever 76 is arranged to operatively engage an anti-friction roller carried by operating lever 81 of a compressed air pilot valve 80. The purpose of the air valve will later appear.

*Variable speed drive gear for die spindle*

The variable speed spindle drive mechanism designated as an entirety by 7 comprises the driven gear 15 fast on the die spindle body 11. The gear 15 is driven from the motor 6 by a train of gears which comprises a shaft 82 rotatably mounted on the main frame of the machine and driven by means of belts 83 from the motor. A bevelled pinion 84 fast on shaft 82 meshes with a bevelled gear 85 on shaft 86. Spur gears 87 and 88 are rotatably mounted on shaft 86 and are provided with clutch teeth to cooperate with a sliding clutch member 89 splined on the shaft. The gears 87 and 88 mesh with gears 90 and 91, respectively, fast on counter shaft 92 and gear 90 in turn meshes with the driven gear 15 on the die spindle. As shown in Figs. 2 and 3, the sliding clutch member 89 can be manually shifted by means of a lever 89a mounted on shaft 89b, which shaft can be manually actuated by hand lever 89c which turns shaft 89d on which is mounted lever 89e which in turn is connected by link 89f with a lever arm 89g on shaft 89b. By shifting the hand lever 89c the die spindle can be driven at either of two speeds for a given motor speed.

*Variable speed drive gear for carriage feed mechanism*

The variable speed drive mechanism designated as an entirety by the numeral 8 and which is operatively interposed between the die spindle and the carriage feed mechanism 5, comprises an elongated main shaft 93 which extends practically from end to end of the machine with bearing supports in the main frame thereof. A second shaft 94 (Fig. 6) has a sleeve 95 rotatably mounted thereon with a spur gear 96 keyed to the sleeve and in mesh with driving gear 16 fast on the spindle body 11 of the die. The sleeve 95 comprises a pinion 97 and an adjacent spur gear 98 is keyed on shaft 94. Spur gear 99 and pinion 100 are keyed on counter shaft 101 and mesh, respectively, with pinion 97 and gear 98. Shaft 94 is thus driven from spindle body 11 with a double speed reduction.

Shaft 94 carries a pinion 102 at its left end which drives a gear 103 fast on shaft 104 and a gear 105 also fast on shaft 104 drives gear 106 fast on the main shaft 93 through an idler gear unit consisting of a pair of gears 107 and 108 and a splined supporting sleeve 109, the gear 107 being removable from the sleeve to permit substitution of a gear of different diameter. To permit such substitution the idler gear sleeve 109 is mounted on a stub shaft 110a carried by an adjustably mounted arm 110. This arm is mounted to swing about the axis of gear 106 and can be locked by clamping screw 110b in different positions to accommodate gears 107 of different diameters. Thus a speed change can be made by merely changing one gear and adjusting the position of arm 110.

*Work carriage*

The work-feeding carriage 3 of the machine comprises a frame structure 111 which is fitted with slide strips 112 of metal suitable for bearing engagement with ways 1b, 1b formed on the main frame of the machine (Figs. 21 and 22). One of the slide strips 112 is provided with an adjustable gib 112a by adjustment of which compensation can be made for wear. The carriage frame 111 is provided at its right side with a bolted-on extension 113 which is provided with a removable cover plate 113a which affords access to parts which will presently be described.

*Carriage feed and retraction devices*

The carriage 3 is fed forward toward the die 2 and retracted therefrom by mechanism comprising a cam 114 having a straight elongated cam groove 114a and mounted upon a carrier in the form of a cylinder block 115 which in turn is slidably mounted in the main frame extension 1a to reciprocate transversely of the machine (Figs. 4, 23, 24, 25). The cam plate 114 is pivotally attached to the block 115 by a pivot pin 116 (Fig. 23) and by clamping screws 117, 117 which pass through slots in the plate and permit its angular adjustment. To effect such adjustment a screw 118 is provided (Fig. 5) which is rotatably mounted on the block 115 and actuates a nut 118a that operatively engages cam plate 114 to move it back and forth as the screw is turned. Cam plate 114 drives a follower block 119 which is adjustably secured to the carriage extension 113 by means of a clamping nut. The carriage extension 113 carries a notched plate 121 and the cam block is formed with teeth 119a to engage the notches of such plate, thus providing six different positions of adjustment corresponding to the six notches of plate 121. The block 119 has a depending cylindrical lug 119b which fits an aperture in a block 119c that slidably engages the cam groove 114a. The block 115 is formed with a cylinder 122 having a front cylinder head 123 and a rear head 124. Operatively mounted in the cylinder 122 of the slidable block 115 is a piston 125 having a hollow rod 126 which extends through a stuffing box in the head 124 and at its rear end is secured to a bracket 128 bolted to the frame extension 1a, so that in operation block 115 reciprocates in relation to the fixed piston. Adjacent the piston the rod 126 has a small hole 127 through which the bore of the rod communicates with the interior of the cylinder 122. The front head 123 of the cylinder is fitted with a restricted air hole 123a.

The cylinder block 115 has rigidly attached to it an elongated rack 129 which is arranged to be actuated by pinion 130 keyed on a jaw clutch member 131 which is rotatably mounted on shaft 132 having rotatable bearing support in the frame extension 1a (Fig. 23). A second clutch member 133 is slidably splined on shaft 132 to engage and drive the clutch member 131, a shift lever 134 for the clutch member 133 being mounted on a pivot pin 135 carried by frame extension 1a (Fig. 25). Shaft 132 also carries a drive gear 136 which is driven from gear 137 on shaft 93 through an intermediate gear 138 (Fig. 4).

It will be seen that the work carriage of the machine is advanced toward the die by reciprocation of the cam plate 114 toward the front of the machine and is withdrawn from the die by the reverse movement. The forward feed movement is designed to be effected at relatively low speed by closing the clutch 133 so that the cylinder block 115 and cam plate 114 are driven from the die spindle by means of the rack and gear and other elements of the train of gearing between the cylinder block and the die spindle. The reverse movement of the cam plate 114, on the other hand, is effected at relatively high speed by disengaging the clutch 133 and admitting pressure fluid through the hollow piston rod 126 into the cylinder 122 so as to effect the return movement of the cylinder block and the cam plate thereon.

*Manual operation of the carriage*

Figure 1:
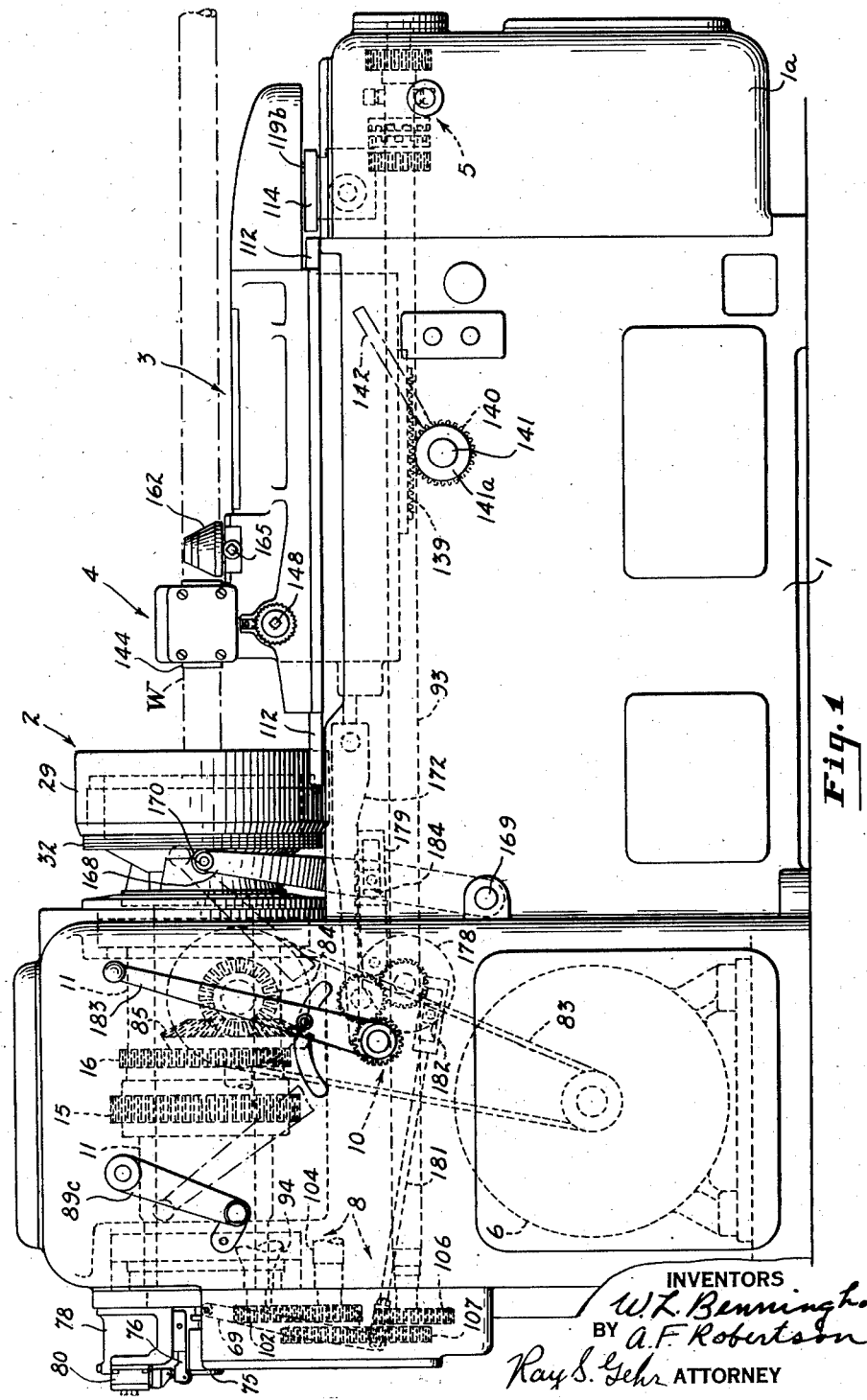

At times it is desirable to move the work carriage manually and to that end the carriage frame 111 is fitted with a rack 139, and a pinion 140 mounted on a transverse shaft 141 rotatably supported in the frame 1 of the machine meshes with the rack so that the carriage can be moved on its supporting ways by rotation of the shaft. Such rotation may be effected manually by applying a hand bar 142 to a capstan 141a on the shaft (Figs. 1, 20, 22). To permit of the manual actuation of the carriage it is necessary to break the drive connection between the carriage and the cam plate 114 and to accomplish this the clamping nut 120 of the coupling block 119 between the carriage and the cam plate may be backed off to permit lowering of block 119 and the disengagement of its teeth 119a from the notches of plate 121.

The work chuck or gripper

The work-holding gripper or chuck mechanism 4 is supported and more or less housed by the frame of carriage 3. The mechanism as shown in Figs. 19–22, comprises a pair of opposed gripper blocks 143, 143 slidably mounted in the carriage frame 111. Each of these blocks carries a gripper jaw 144 secured to the block by a single screw 145. To secure the accurate positioning of the jaw in relation to the block 143 and its rigid support thereon so that the jaw will always be held in proper alignment with the axis of the thread-forming die of the machine, the meeting faces of each block 143 and its mating jaw 144 are transversely channeled in the manner indicated by Figs. 19 and 21, the channel in the block 143 extending horizontally while the channel in the jaw extends vertically. This channel formation of the two parts provides the block 143 with flanges 143a which respectively overlap the top and bottom surfaces of jaw 144 (Fig. 21) while the channel of jaw 144 provides flanges 144a which overlap the vertical sides of block 143 (Fig. 19).

The gripper blocks 143 are actuated by vertically disposed levers 146, 146 which are pivotally mounted intermediate their ends on short shaft sections 147 having threaded holes to engage threaded sections of a supporting shaft 148 which is mounted for rotation in the carriage frame 111 so as to adjustably support the shaft sections 147. The upper ends of levers 146 slidably fit cylindrical holes in short shaft sections 149 rotatably mounted in the gripper blocks 143, joint connection with remarkable freedom of movement between blocks 143 and levers 146 being thus provided. To provide for the easy adjustment of the pivotal supports of the levers 146 the front end of shaft 148 is rotatably mounted in a sleeve 150 which has a screw threaded engagement with the carriage frame 111. The flanged end of sleeve 150 is notched for engagement with a detent 151 adjustably mounted on frame 111. In addition, the rear end of shaft 148 has fixed upon it a cylindrical sleeve 152 which is longitudinally grooved to cooperate with a spring detent 153 slidably mounted in frame 111. By loosening the detent 151 and rotating the sleeve 150 the pivotal supports of levers 146 can be shifted forward or rearward in relation to the axis of the gripper jaws 144. Such adjustment is a matter of great convenience both in the original assembly of the gripper mechanism and later when the gib or gibs 112a may be adjusted to compensate for wear after prolonged use.

The levers 146 are actuated by blocks 154 slidably mounted in frame 111, these blocks being fitted with short shaft sections 155 having cylindrical apertures in which the lower ends of levers 146 are operatively engaged, thus forming connections between the blocks and the levers like the connections between the upper ends of the levers and the gripper blocks 143. The blocks 154 in turn are driven by a toggle linkage comprising the links 156, 156 which are in turn connected to block 157 slidably mounted to reciprocate in the frame 111 on lines parallel to the axis of the machine (Figs. 19, 20). The block 157 is arranged to be actuated by a lever 158 pivotally mounted on the frame 111 and operatively connected with block 157 by link 158a. The lever 158 is itself driven by a fluid pressure motor 159 comprising a trunnion mounted cylinder 160 enclosing a piston with a rod 161 which is pivotally connected to the free end of lever 158. The motor cylinder may be connected with a source of compressed air or other working fluid. It will be seen that when the piston of motor 159 is moved forward toward the threading die the toggle linkage is straightened and the chuck jaws are moved toward each other to grip the work, and on the reverse movement of the motor cylinder the chuck jaws are separated to release the work.

The work-supporting means

To support the work piece and facilitate its engagement by the chuck jaws the carriage is provided with a pair of conical rollers 162 which are mounted upon slides 163 that engage ways 111b on the frame 111. These slides carry trunnion blocks 163a upon which the rollers are mounted with interposed ball bearings 164. To provide for adjustment of the rollers 162 toward and from each other a rod 165 is rotatably mounted in a bearing bracket 166 on frame 111 and the rod is formed with screw threads engaging mating threads in the slides 163, one set of the threads being right hand and the other left hand so that rotation of the rod 165 in one direction moves the rollers 162 toward each other while its rotation in the opposite direction moves the rollers away from each other. The bearing bracket 166 is provided with a spring pressed detent 167 designed to engage depressions in the rod 165 to hold it in different adjusted positions.

Automatic chaser re-setting mechanism

Following the rapid collapse of the chasers at the end of the thread-cutting operation caused by the release of the cam abutment block 48, it is necessary to restore the chasers and the various related parts of the mechanism including the inner and outer slide structure and the cam abutment block, to their respective positions occupied at the beginning of the thread-cutting operation. This restoration of the parts is usually referred to as re-setting.

In the machine illustrated the re-setting is automatically effected by devices which comprise a re-setting yoke 168 carried by a pivotal support 169 on the main frame in vertical alignment with the axis of the die. The upper ends of the yoke arms are fitted with anti-friction rollers 170 designed to engage the flat annular surface of the outer slide head member 28 adjacent its periphery (Figs. 1, 28). The yoke carries a fixed pawl 171 designed to engage the notches of a rack member 172 which is operatively connected to the carriage 3. This latter connection is effected through a short shaft section 173 rotatably mounted in the rack, a bolt 174 which slidably engages a hole in the shaft section 173 and a nut 175 operatively engaging the bolt and the carriage frame to adjustably connect the two parts. The connection of the rack 172 to the carriage also comprises a heavy coil spring 176 interposed between the shaft 173 and the head of the bolt 174 and a relatively light coil spring 177 interposed between the shaft 173 and the carriage frame. With the chasers of the die set for a cutting operation and the carriage fully retracted both of the springs 176 and 177 should be under some compression.

The notches of the rack 172 are the same in number and spacing as the notches of the carriage plate 121 by which the cam follower block 119 is adjustably connected with the carriage. Thus when an adjustment of the carriage and the work gripper in relation to the die to any one of six different positions is effected by fixing the position of the cam follower block 119, the pivotal connection of the rack 172 with the bolt 174 permits the lifting of the rack and the engagement of the yoke pawl with a different rack notch corresponding to the adjustment of the block 119 without changing the position of the re-setting yoke in relation to the die.

In the operation of the machine for cutting taper threads, as the work piece is advanced by the carriage in relation to the chasers the outer slide structure 25 of the die moves toward the left by an amount corresponding to the retraction of the chasers needed for the predetermined taper of the threads being cut. To insure that the outer slide 25 shall be free for such movement without interference from the re-setting yoke 168 which is simultaneously moved by the carriage, the position of the pivotal support of the yoke in relation to its connections with the rack 172 and the slide 25 of the die is chosen such that the rack will move the anti-friction rollers 170 of the yoke 168 more rapidly than the outer slide 25 is moved, even for a thread of the maximum taper. On the reverse movement of the carriage following rapid collapse of the chasers the rack 172 is drawn to the right by the carriage and causes the re-setting yoke 168 to correspondingly move the outer slide 25 and re-set the chasers.

In its re-setting movement the outer slide 25 not only restores the chasers to their initial position ready for the next cutting operation, but also carries with it the inner slide structure and the abutment 48. This follows from the fact that the train of cam connecting devices which transmit the movement of the inner, work-engaging slide to the outer slide is non-overhauling and, through cam 54, is anchored in abutment 48. Hence when the outer slide is moved by the re-setting yoke, the outer slide, cams, inner slide and abutment move as a unit and return to their initial positions. As the abutment moves into its initial position its spring-pressed latches 64 snap into locking engagement with the groove 59a and spring 66 moves sleeve 65 to the right with its collar 65a in position to keep latches 64 in their locking engagement with groove 59a. A sufficient re-setting movement of the outer slide 25 by yoke 168 is insured (without injury to the mechanism) by the loaded state in which spring 176 is maintained.

*Manual chaser collapse and re-setting devices*

It is desirable at times, as when the chasers are to be inspected or changed, to draw the chasers radially apart to increase their accessibility and it is desirable to be able to do this manually. Accordingly the following-described devices are provided to effect the manual collapse and re-setting of the die.

Adjacent the stem of the yoke 168 is a cam disc 178 rotatably supported by a shaft 178a carried by the machine frame 1. This disc is connected by a pair of slotted links 179 with the yoke 168 through blocks 180 pivotally attached to the yoke and having a sliding engagement with the slots of the links, thus effecting a lost motion connection between the links and the yoke. The cam disc 178 is also connected by a link 181 with the previously described lever 69, the link 181 having its right end slotted to cooperate with a slide block 182 pivotally attached to the cam disc.

For manual operation of the cam disc 178 a hand lever 183 is mounted on the front of the machine. But for interference by shaft 93 the shaft 178a might be extended to the front of the machine and hand lever 183 mounted upon it. To avoid such interference the lever is mounted on a shaft 183a rotatably supported on the frame 1 and operatively connected to cam disc 178 by gear 184 on shaft 183a, gear 185 on shaft 178a and idler gear 186 on a shaft 186a carried by the frame 1.

In Fig. 28 the hand lever 183 is shown in its normal position and it will be seen that by swinging the lever to the left the cam disc 178 is rotated counter-clockwise. This rotation, after some lost motion between disc 178 and link 181, serves to move sleeve 65 to the left, unlatch the abutment block 48 and effect the collapse of the chasers, the corresponding movement of the yoke 168 being permitted by the lost motion connection between it and the links 179. To permit the stated movement of the cam disc 178 independently of the work carriage the peripheral cam surface of the disc is arranged to engage the extended left end of the rack 172 and swing it upward on its pivotal connection with the bolt 174 enough to disengage it from the pawl 171 of the re-setting yoke. This action is shown in Fig. 30. When it is desired to re-set the chasers the hand lever 183 is moved to the right to and beyond its normal position, as shown in Fig. 31. This moves the re-setting yoke 168 and the outer slide of the die to the right to effect the re-setting movements of the various parts of the die in the manner previously described. Also during this movement the cam disc 178 is turned to a position permitting the return of the rack 172 into engagement with the pawl 171 thus restoring the connection between the carriage and the yoke 168. The hand lever may then be restored to its normal position shown in Fig. 28. In restoring the connection of the pawl 171 with the rack 172 the engagement of the pawl in the correct notch of the rack is insured by the action of spring 177.

*Fluid pressure control devices*

In the normal operation of the machine its various operations are controlled automatically in a predetermined cycle which is initiated by the manual movement of the work piece into position to be engaged by the chasers and gripped by the chuck. The parts and devices involved in such automatic control will now be described. Referring to the rear elevation shown in Fig. 26 and the diagram shown in Fig. 32, 187 is a compressed air supply pipe which is connected through a manual cut-off valve 188 with some suitable source of compressed air. Such a source may be a motor-driven compressor mounted upon the main frame of the machine. Mounted on the rear side of the machine are a cam-actuated pilot valve 189, pressure-operated valves 190 and 191 and a cam-operated valve 192. Similarly mounted is a compressed air motor 193 having a trunnion cylinder 194, piston 195 and piston rod 196 extending through both heads of the cylinder. A cam 197 is adjustably mounted on the piston rod 196 in position to actuate the pilot valve 189. Another cam device 198 (Fig. 27) is operatively connected to the piston rod 196 and mounted in position to actuate the valve 192. This cam device comprises a cam proper 199 carried by a screw 200 adjustably mounted on a slide 201 carried by bracket 202, the slide 201 being flexibly connected to the piston rod 196 by a pin 203.

Connections for the several pressure-operated devices to the supply main 187 are provided as follows: pipe 204 leads from the main to the earlier described pilot valve 80 mounted on the left end of the machine. Pipe 205 leads from the main to pilot valve 189, pipe 206 leads from the main to pressure-operated valve 190, pipe 207 leads from the main to the pressure-operated valve 191 and pipe 208 leads from the main to the cam-operated valve 192. The pilot valve 80 is connected in turn to the actuating cylinder of valve 190 and this valve is connected by pipes 210 and 211 to the left and right ends respectively of the motor cylinder 193, the pipe 210 being fitted with a restrictor 212. A pipe 213 leads from the pilot valve 189 to the pressure-operating cylinder of air valve 191 which in turn is connected by pipes 214, 215 with the right and left ends respectively of the cylinder of the chuck motor 159. The valve 192 is connected by air pipe 216 to the rear end of the fixed hollow piston rod 126 of the fluid pressure feed motor. The several air valves and reciprocating fluid pressure motors are not shown and described in detail as various commercially available forms of these devices can be employed in the carrying out of my invention.

The cycle of control operations involved in the operation of the machine may best be followed in the diagram of Fig. 32. Upon the presentation of the work piece, such as a section of pipe or rod designated by the letter W, to the pressure pad 43a of the die, a slight endwise movement of the pad by the pipe when transmitted through the parts 43, 45, 73, 70, 75 and 76 opens the pilot valve 80 and admits compressed air to actuate valve 190 which in turn energizes motor 193 to move its piston 195 toward the right. The first result of this movement is the opening of pilot valve 189 which energizes valve 191 to admit air to the chuck motor 159 and effect the gripping of the work piece. Thereupon the continued movement of the piston rod 196 of the motor 193 effects the closing of the clutch jaws 131 and 133 to initiate the forward feeding movement of the work carriage through the gear drive of the cam block. The described movement of the piston rod 196 has meanwhile caused the cam 199 to release the actuating spring of the valve 192 and open the cylinder 122 to exhaust through the hollow piston rod 126 and pipe 216.

The fluid pressure control and actuating devices continue in the states described during the thread-cutting operation. At the end of the operation the disengagement of the abutment latches 64, which causes collapse of the cutters, results in the rapid movement of the abutment to the left and the movement by the abutment of the block 77 which carries the lever 76 to the left and permits the actuating lever 81 of pilot valve 80 to drop into the notch of lever 76 and close the pilot valve (Fig. 34). This action results in the shifting of valve 190 which starts the movement of piston 195 of motor 193 toward the left. The rate of this piston movement is moderated and controlled by the restrictor 212. The first effect of the movement is to separate the clutch members 131, 133 to stop the forward feed of the carriage. The next action of the piston movement is to move the valve 192 into the position shown in Fig. 32, closing the exhaust from the cylinder 122 and admitting compressed air thereto so as rapidly to move the cylinder and retract the carriage. Finally the continued movement of the piston 195 closes the pilot valve 189 thus shifting the valve 191 to reverse the chuck motor 159 and open the gripper jaws so that the work piece W can be removed to make way for the next one.

*Operation of the machine as an entirety*

The machine which has been described obviously is designed to handle large volume production. Preparatory to starting the threading of a given type and size of work, suitable setting and adjustment of the machine are first effected. Thus the length of the thread to be cut may require adjustment of the connection between the carriage and the follower 119 of the actuating cam since obviously the gripper jaws must be positioned further away from the chasers for the cutting of a long thread than for the cutting of a short one. As has been stated the construction illustrated permits adjustment of the feed follower in any one of six positions on the carriage, and such adjustment determines the distance between the gripper jaws and the die at any particular point in the cycle of operations. In the drawings (Fig. 23) an intermediate adjustment is shown suitable for cutting a thread of medium length. To permit of the necessary movement of the carriage in adjusting the cam connection the rack 172 is, of course, lifted out of engagement with the pawl of the re-setting yoke 168. When this has been done the carriage can be moved by the rack and pinion mechanism actuated by the hand bar 142.

The die mechanism also must be suitably adjusted for length, diameter and taper of thread to suit the work to be performed. The length of the thread is determined by adjustment of the screw 47 which varies the distance between the left end of the inner slide member 46 and the right end of the sleeve 65, the movement of which by member 46 causes the rapid collapse of the chasers and terminates the thread-cutting operation. By using a known type of screw driver or wrench having a graduated stem to turn the screw 47 the adjustment in question can be effected with the resquisite degree of exactness. Such a wrench is shown and described in the United States patent to Robertson No. 2,265,764. The described adjustment for length of thread is made without affecting the diameter of the thread cut. The significance of this last statment lies in the fact that the norminal diameters of taper threads are determined by the diameter at the larger end of the thread. Consequently when our apparatus has been adjusted for diameter, this latter adjustment is not disturbed by the length adjustment.

The adjustment of the die for diameter is effected by backing off the set screws 31 thus freeing the ring 29 for rotational adjustment on the head member 28 of the outer slide structure. This adjustment moves ring 34 and the cam blocks 37 attached to it axially in relation to the slide member 28 and correspondingly adjusts the chaser blocks 21. In making this adjustment the graduations on the ring 32 enable the operator to achieve the adjustment for diameter with the desired accuracy.

The adjustment for diameter which has been described obviously is effected independently of and does not affect the adjustment for the length of the thread to be cut. Furthermore, inasmuch as the adjustment for diameter is effected at a point between the cam blocks 37 and the outer slide member 28, it will be seen that this adjustment for diameter does not modify the tension of the springs 40 which are interposed between the spindle head 19 and the outer slide member 28. In other words the actions of the springs 40 in the operation of the die remains unchanged for all diameter adjustments.

Finally it may be necessary to adjust the die for thread taper. This adjustment is effected by turning screw 53 to slide the cam block 52 to the right or to the left (as viewed in Fig. 7) and thereby effect angular adjustment of the swinging cam 49 which varies the movement of the outer slide effected by a given movement of the inner slide of the die. This adjustment, like that for the length of the thread, is effected by introducing a wrench with graduated stem to engage the screw 53 and with the graduations as a guide the operator can set the swinging cam 49 for any desired taper or can set said cam with its groove parallel to the axis of the die so that no motion is transmitted from the inner slide to the outer slide and a straight thread is formed.

It may also be necessary for the operator to adjust the work supporting rollers 162 toward or away from each other according to the diameter of the work to be threaded so that the said rollers will support the work piece in approximate axial alignment with the axis of the threading die. It may be added in this connection that interchangeable gripper jaws 144 may be provided for the work chuck and in changing from work of small diameter to work of large diameter, or vice versa, it may be desirable to change the gripper jaws.

With the apparatus fully adjusted for the specific work to be performed and with the compressed air supply turned on and the drive motor 6 running, the machine operator has only to place the pipe section to be threaded on the conical rollers of the carriage and press the end of the pipe against the pressure pad 43a of the inner slide structure of the die. The resulting initial movement of the slide member 43 effects movement of the cylindrical cam 75 on the left end of the machine to open the pilot valve 80 in the manner previously described. This operation of valve 80 initiates the cycle of operations already described in connection with the fluid pressure devices illustrated in Fig. 32. That is to say the chuck jaws are closed on the work, the clutch elements 131, 133, are closed to connect the die spindle with pinion which drives the rack to move the feed cam and the movement of the cam starts the forward feed movement of the carriage, the chuck and the work piece which had already been gripped by the chuck. The resulting forward movement of the work piece causes the inner slide structure of the die to move toward the left and this movement relative to the spindle and the cam abutment block 48 is transmitted in reduced amount through the cam members 49, 54 and 57 to the outer slide structure of the die so that the latter is moved toward the left in relation to the die spindle and the cams 37 cause the outward receding movement of the chaser blocks 21 and chasers 22 to effect the predetermined taper of the thread cut.

When the predetermined length of thread has been formed the left end of the inner slide member 46 engages the sleeve 65 to move it toward the left and release the abutment latches 64, whereupon the abutment 48 is quickly moved toward the left under the pressure of springs 61. The abutment in this movement carries with it the cam members 49, 54 and 57 and the inner and outer slide structures of the die; and such movement of the outer slide structure causes the rapid outward movement of the chaser blocks effecting the so-called collapse of the chasers.

The collapsing movement of the abutment 48 also actuates the air valve lever 76 with resultant closure of the air pilot valve 80 which is followed by the series of actions previously described in connection with Fig. 32. To repeat briefly, the closing of the pilot valve 80 shifts the valve 190 to reverse motor 193 to start movement toward the left of its piston 195. This piston movement actuates clutch lever 134 to terminate the forward feed of the carriage by the rack and pinion devices. Next the valve 192 is shifted to close the exhaust from the feed cylinder 122 and admit compressed air thereto to effect the rapid return movement of the carriage. The restricted air outlet 123a in the front head 123 of cylinder 122 avoids unduly rapid movement of the feed cylinder and the carriage. Finally the reverse movement of motor piston 195 closes pilot valve 189 and shifts the main air valve 191 to reverse the chuck motor and release the gripper jaws so that the operator can lift the threaded work piece off the carriage; whereupon another work piece can be fed to the machine with a repetition of the cycle of operations described.

During the return movement of the carriage the re-setting yoke 168 is swung to the right to correspondingly move the outer and inner slide structures and the abutment member of the die in relation to the die spindle so as to re-set the chasers and restore all of the parts to their proper positions for the start of another threading operation. This same movement of the resetting yoke is transmitted through link 179, cam disc 178, link 181 and lever 69 to the sleeve 65 to move the latter to the right and with it the abutment 48 to restore the latter to its latched position.

By suitably adjusting the cams 197 and 199 the succession of operations above described can be nicely timed in relation to each other in desired manner.

If in the use of the machine it becomes desirable to inspect or change chasers they can quite easily and quickly be fully retracted for that purpose. The hand lever 183 and associated parts with which the machine is provided makes it extremely easy for the operator in the manner previously described to effect manual release of the cam abutment and collapse of the chasers and thereafter to re-set the abutment and chasers by a simple movement of the said hand lever, the mechanism being so designed that this movement automatically disconnects the collapsing and resetting devices from the machine carriage which normally actuates those devices. Furthermore the slotted construction of links 179 and 181 by providing lost motion connection between the cam member 178 and the re-setting yoke and between the said cam member and the link 181, makes it possible to maintain the working connection of the stationary manual lever 183 with the collapsing and re-setting devices while these devices are operatively connected for their normal automatic operation by the machine carriage.

From the foregoing description it will be apparent that various advantages flow from novel features of our improved apparatus. Thus the provision of the mechanical drive for the carriage with fluid drive for the return movement provides the advantage of an accurate rate of feed with a smoothly working rapid return of the carriage that contributes markedly to the shortness of the complete operating cycle of the machine.

Furthermore the use of fluid drive and control of the several devices involved in the cycle of operations makes it possible to achieve nice control and timing of the several related actions by means of exceedingly simple mechanism, as compared with the complexities involved were purely mechanical actuation employed. An example of this is found in the actuation of the chuck or work gripper jaws. Upon the opening of the pilot valve 80 by the manual engagement of the work piece with the pressure pad of the die the valve 190 is quickly operated to admit air to the motor 193 and at the very beginning of the movement of the motor piston the pilot valve 189 is opened to admit air to the chuck motor 159 which quickly closes the chuck jaws to grip the work piece. The closing movement is rapid because the resistance is small until the jaws come into firm engagement with the work piece, whereupon the air pressure builds up in the chuck motor cylinder to provide a strong gripping action. The load upon the motor 193 to bring about this closing of the chuck is quite small so that the relatively small port of restrictor 212 through which air is supplied to motor 193 is sufficient to provide a rapid initial movement of the piston 195. The continued movement of the piston, however, is moderated by the restrictor 212 so that the clutch jaws 131 and 133 are not closed with undue force. When the pilot valve 80 is closed, on the sudden collapse of the chasers, the air valve 190 is quickly shifted to reverse the motor 193 but the movement of the motor piston is moderated by the action of the restrictor 212 to effect the opening of the clutch jaws 131 and 133 and the actuation of the valve 192 to energize the rapid return cylinder of the feed cam. Meanwhile the actuation of the chuck motor to release the work piece is delayed by the simple expedient of lost motion travel of the cam 197 which finally permits closing of the pilot valve 189 and the opening of the chuck. In a word, relatively complex timing of the various parts of the mechanism is effected by means that are mechanically simple.

As has already been noted the small air orifice in the front end of the return cylinder of the feed cam gives a dash-pot action which cushions the rapid return movement.

It will be observed that the means for feeding the carriage during the thread-cutting operation provides for both a wide range of speed adjustment by change of gears and a very fine adjustment secured by the angular adjustment of the feed cam. The advantages of these combined adjustments are obvious.

It will be appreciated that the adjustable connection provided between the carriage and the feed cam follower makes it possible to support the work piece as closely as possible to the chasers for any particular length of thread cut. This is an important feature contributing to the quality of the work performed by the machine. It is noted too that the provision for severing the adjustable connection between the carriage and the feed cam permits the carriage to be retracted to an extreme position away from the die so as to give ample working space for change of chasers and adjustment and inspection of the die mechanism.

Obviously the improved manual collapse and re-setting devices, which in operation automatically sever the working connection between the carriage and the normal re-setting means, are simple in construction and permit the manual collapse and re-setting of the chasers with a minimum of time and effort on the part of the operator.

With respect to the thread-cutting mechanism it will be observed that the hollow spindle 11 serves, in distinction from prior apparatus, both as machine spindle and as tool body. Thus the short cutter head 19 may be thought of, and in fact is, a rigid part of the machine spindle. The simplification thus secured is apparent.

Furthermore by treating the machine spindle as tool body and disposing the mechanism necessary to effect gradual retraction and collapse of the chasers to a large extent within the spindle, it is possible to dispose the tool head and the chasers relatively close to a main supporting bearing of the spindle, thus achieving exceptional rigidity or firmness of support for the chasers and making it feasible to design the chasers with large clearance favorable to clean-cut and accurate work. The greatest possible advantage of this feature may be realized throughout the range of lengths of thread cut by the machine because of the adjustability of the connection between the carriage and its feed mechanism with resultant maintenance (previously noted) of the work support relatively close to the chasers. That is to say the two features combined insure firm non-vibratory support for both the chasers and the work. Also, the enclosure of much of the mechanism of the thread-forming apparatus within the tool body or spindle makes possible an effective dust-tight enclosure of the mechanism and the maintenance of effective lubrication at all times, a condition favorable to low wear.

The arrangement of the adjustment for thread diameter at a point between the chasers and the springs 49 so that such adjustment does not vary the tension of the springs results in a smooth retraction movement of the chasers throughout the range of the diameter adjustment.

It will be observed that the swinging cam 49 together with the cam 52 and the latter's actuating screw 53, constitute relatively simple means for continuously varying the taper of the thread cut throughout a wide range, including zero taper for cutting straight threads. Furthermore, although these adjustable devices are disposed entirely within the spindle the adjustment can easily be effected.

The control of the fluid pressure operated devices by movement of the parts of the thread-cutting mechanism is effected in a relatively simple manner without complication of or interference with the chaser retracting or collapsing mechanism.

It will be observed that the improved change speed gearing provided in the gear train between the machine spindle and the cam feed for the carriage simplifies both the construction and the work of speed change because it is necessary in such change merely to substitute one idler gear and effect a simple adjustment of the arm 110 on which that gear is mounted, as compared with the usual troublesome double adjustment of an idler spindle in prior speed gear change gearing.

The construction of the work gripper or chuck of the machine presents some novel and advantageous features. Thus the double cylinder joints at the upper and lower ends of the upright levers 146 are characterized by a minimum number of working surfaces, large areas of the working surfaces with resultant small wear, and attainment of free and non-binding action of the joints without accurate alignment of the clutch blocks 143, slides 154 and the lever-supporting shaft 148.

The construction of the gripper jaws and their supporting blocks or slides is also advantageous. The formation of the interfitting faces of block 143 and jaw 144 with channels at right angles to each other so that horizontal positioning flanges are formed on the block 143 to embrace the jaw 144 and vertical flanges are formed on the jaw to embrace the block, affords a construction which is easily produced with requisite accuracy, as by grinding, and also requires only a single screw to secure the jaw accurately and rigidly to its supporting block.

Finally it is not only possible in assembly to suitably relatively position the two upright levers 146 on their supporting shaft 148, but also it is easy to adjust the pivotal supports of the two levers in unison simply by rotating the bearing sleeve 150, thus providing compensation for wear of the gib 112a to maintain the chuck in axial alignment with the spindle of the thread-cutting apparatus.

It will, of course, be understood that the overall advantage attained by our improved machine consists in the fact that its cycle of operations is carried out by the apparatus with great rapidity and nicety of timing so that the machine is capable of turning out a very large volume of work of high quality.

As has been indicated in the foregoing description the present invention is not limited to apparatus for cutting external screw threads. Thus by a suitable modification of the thread-forming apparatus provision is made for the cutting of internal taper threads and such modified thread-forming apparatus can be utilized and applied with all of the advantages of the die of the present application.

While it is considered preferable to use compressed air as the fluid pressure medium of our machine, it is to be understood that suitable liquid can be used as the fluid medium. Also it is to be understood that in the practice of our invention, various features of construction equivalent to those illustrated can be substituted within the bounds of the following claims.

What is claimed is:

1. In a machine tool, the combination of a main frame; thread-cutting mechanism rotatably mounted on the frame, said mechanism comprising a tool body, chasers movably mounted on the body, means mounted on the tool body for retracting the chasers relative to a work piece operated upon by the tool, and a work-engaging pressure pad movably supported by the tool body adjacent the chasers; a fluid-pressure-actuated chuck movably supported on the frame; means operatively interposed between the frame and the chuck for feeding the chuck toward the thread-cutting mechanism to advance a work piece carried by the chuck relative to the chasers; and means controlled by movement of the pressure pad, caused by presentation of the work piece to the chasers, for closing the chuck on the work piece and starting the said feeding means.

2. In a machine tool, the combination of a main frame; thread-cutting mechanism rotatably mounted on the frame, said mechanism comprising a tool body, chasers movably mounted on the body, means mounted on the tool body for retracting the chasers relative to a work piece to cut a taper thread thereon, and means operatively associated with the chaser retracting means for causing rapid collapse of the chasers at the end of the thread-cutting operation; a fluid-pressure-actuated chuck movably supported on the frame; means interposed between the frame and the chuck for feeding the chuck toward the thread-cutting mechanism to advance a work piece carried by the chuck relative to the chasers; means interposed between the frame and the chuck for effecting rapid reverse movement of the chuck after the thread-cutting operation; and means controlled by movement of the collapsing means of the thread-cutting mechanism for successively stopping the advance movement of the chuck, causing the reverse movement thereof and opening the chuck to release the work piece.

3. In a machine tool, the combination of a main frame; thread-cutting mechanism rotatably mounted on the frame, the said mechanism comprising a tool body, chasers movably mounted on the body, means mounted on the tool body for retracting the chasers relative to a work piece to cut a taper thread thereon, means operatively associated with the chaser retracting means for causing rapid collapse of the chasers at the end of the thread-cutting operation, and a work-engaging pressure pad movably mounted adjacent the chasers; a fluid-pressure-actuated chuck movably supported on the frame; means interposed between the frame and the chuck for feeding the chuck toward the thread-cutting mechanism to advance a work piece carried by the chuck relative to the chasers; means controlled by movement of the pressure pad, caused by presentation of the work piece to the chasers, for closing the chuck on the work piece and starting the said feeding means; means interposed between the frame and the chuck for effecting rapid reverse movement of the chuck after the thread-cutting operation; and means controlled by movement of the collapsing means of the thread-cutting mechanism for successively stopping the advance movement of the chuck, causing the reverse movement thereof and opening the chuck to release the work piece.

4. In a machine tool, the combination of a main frame; thread-forming apparatus having chasers and means for effecting automatically gradual receding and rapid collapsing of the chasers, said apparatus being rotatably supported on the frame; a carriage slidably mounted on the frame; fluid-pressure-operated chuck mechanism mounted on the carriage; motor driven means connected to rotate the thread-cutting apparatus; a gear train comprising a disengageable clutch interposed between the rotatable thread-forming apparatus and the carriage for advancing the carriage in synchronism with the rotation of the thread-cutting apparatus; fluid pressure means interposed between the main frame and the carriage for retracting the carriage; fluid pressure means connected to a member of the clutch for closing and opening said clutch; and means controlled by movement of the means for effecting the collapse of the chasers for causing in succession the disengagement of the clutch, the retraction of the carriage by the fluid pressure means, and the opening of the chuck.

5. In a machine tool, the combination of a main frame; thread-cutting mechanism operatively supported on the frame; chuck mechanism operatively supported on the frame; power-driven means for effecting synchronized rotational and translational movements of the thread-cutting and chuck mechanisms in relation to each other and to the main frame, the means for effecting the translational movement comprising a cam slidably mounted for rectilinear movement on one of the three frame, thread-cutting and chuck parts of the tool and a follower mounted on another of said parts for adjustment thereon transversely of the cam movement to different operative positions for cooperation with the face of said cam and serving when adjusted to vary the positions of the thread-cutting and chuck mechanisms in relation to each other at the beginning of the said translational movement which effects the thread-cutting operation.

6. In a machine tool, the combination of a main frame; thread-cutting mechanism comprising a tubular tool body rotatably mounted on the frame, chasers movably mounted on the tool body at one end thereof, means disposed chiefly within the tubular body and rotatable therewith for retracting the chasers to cut a taper thread, and a work-engaging pressure pad movably mounted adjacent the chasers; a fluid-pressure-actuated chuck movably supported on the frame; means operatively interposed between the frame and the chuck for feeding the chuck toward the thread-cutting mechanism to advance relative to the chasers a work piece carried by the chuck; means mounted on the frame adjacent the end of the tool body remote from the chasers for controlling the closing of the chuck on the work piece and the starting of the feeding means; and means extending through the hollow tool body operatively connecting the pressure pad and the said controlling means to actuate the latter when a work piece is presented to the chasers and thereby effect the closing of the chuck and the starting of the feeding means.

7. In thread-cutting apparatus, the combination of a main frame; thread-cutting mechanism of the retractable chaser type comprising a tool body having a main tubular part and a head structure secured thereto, chasers movably mounted on the head of the tool body, two slide structures mounted chiefly within the tool body for sliding movement longitudinally thereof, one of the slide structures having an operative connection with the chasers to cause their receding movement and the other slide structure having a pressure pad to be engaged by a work piece, and devices disposed within the tubular body operatively connecting the slide structures together to transmit movement of the work-engaging slide to the chaser-actuating slide; and means for rotatably supporting the tool body comprising a bearing interposed between the chaser end of the body and the frame.

8. In thread-cutting apparatus, the combination of a main frame; thread-cutting mechanism of the retractable chaser type comprising an elongated tubular tool body having an axially short head structure, chasers movably mounted on the head of the tool body, two slide structures mounted chiefly within the tool body for sliding movement longitudinally thereof, one of the slide structures having an operative connection with the chasers to cause their retracting movement and the other slide structure having a pressure pad to be engaged by a work piece to be threaded, and devices disposed within the tubular body operatively connecting the slide structures together to transmit movement of the work-engaging slide to the chaser-actuating slide; means for rotatably supporting the tool body comprising two bearings disposed, respectively, between the two ends of the tubular body and the frame with the bearing adjacent the head of the tool body in a plane close to the chasers and affording them a firm support; and means operatively interposed between the frame and tool body for applying driving force to the tool body at points between its supporting bearings.

9. In thread-cutting apparatus of the receding chaser type, the combination of an open-ended hollow tool body adapted to be rotatably supported; chasers movably mounted on one end of tool body; means disposed chiefly within the tool body for effecting the receding movement of the chasers, said means comprising a slide structure connected to the chasers, a second slide structure arranged to be engaged by the work, both of said slide structures being slidably supported within the tool body for movement parallel to the axis thereof, and means within the tool body operatively connecting the two slide structures, said connecting means comprising an adjustable part accessible through an open end of the tool body for manual actuation to vary the movement transmitted from one slide structure to the other.

10. Thread-cutting apparatus as claimed in claim 9 in which the adjustable means for effecting a receding movement of the chasers comprises a pivotally adjustable bodily movable cam, and means operatively connected to the cam for adjusting it angularly on its pivotal axis and holding it in its adjusted angular position.

11. In a machine tool, the combination of a main frame; a thread-cutting tool operatively supported thereon; a work support on the frame; means, comprising power-driven mechanical gearing, for effecting relative rotational movement of the said tool and work support; means for effecting relative feed and retraction movements of the work support and tool comprising a cam mounted to reciprocate in relation to the frame, a disengageable driving connection between the said mechanical gearing and the cam capable of moving the cam slowly in one direction to effect the relative feed movement of the work support and tool and fluid pressure power means connected to the cam for moving it rapidly in the opposite direction to effect the relative retraction movement of the work support and tool; and means controlled automatically in timed relation with the slow movement of the cam for disconnecting the said gearing from the cam and for initiating the rapid fluid power movement of the cam.

12. A machine tool as claimed in claim 11 in which the mechanical gearing is changeable to move the cam at different speeds and the cam is pivotally adjustable to vary its slope in relation to the direction of its movement.

13. In a machine tool, the combination of a main frame, a thread-cutting tool operatively supported thereon, said tool comprising a tool body, cutters movably mounted on the body and means for collapsing the cutters; a work support on the frame; means, comprising power-driven mechanical gearing, for effecting relative rotational movement of the said tool and work support; means for effecting relative feed and retraction movements of the tool and work support comprising a cam mounted to reciprocate in relation to the frame, a disengageable drive connection between the said mechanical gearing and the cam capable of moving the cam slowly in one direction to effect the relative feed movement of the work support and tool and fluid pressure power means connected to the cam for moving it rapidly in the opposite direction to effect the relative retraction movement of the work support and tool; and means controlled by the collapse of the cutters for disconnecting the said gearing from the cam and for initiating the rapid fluid power movement of the cam.

14. A machine tool as claimed in claim 11 in which the driving connection between the cam and the mechanical gearing for effecting relative rotational movement of the tool and the work support comprises a rack rigidly connected to the cam.

15. A machine tool as claimed in claim 11 in which the driving connection between the cam and the mechanical gearing for effecting relative rotational movement of the tool and the work support comprises a rack rigidly connected to the cam and in which the fluid power means comprises a cylinder rigidly connected to the cam.

16. A machine tool as claimed in claim 11 in which the means for effecting relative feed and retraction movements of the work support and tool comprises a cam and cam follower one of which is adjustable on the machine part to which it is connected to vary the mutually relative positions of the thread-cutting tool and the work support at the beginning of their relative thread-cutting movement.

17. A machine tool as claimed in claim 11 in which the means for effecting relative feed and retraction movements of the work support and tool comprises a cam and cam follower one of which is readily disengageable from the part to which it is normally connected to permit wide separation of the tool and work support.

18. In thread-cutting apparatus of the receding chaser type, the combination of a main frame; a chambered tool body rotatably supported on the frame; chasers movably mounted on the tool body; a work support on the frame; means for causing relative feeding movement of the tool body and work support; and means for effecting receding movement of the chasers during the said feeding movement, the said means comprising a slide structure disposed for movement axially of the tool body and having a part slidably supported within the tool body and another part operatively connected to the chasers and adjustably connected to the slidably supported part to vary when manually adjusted the nominal diameter of the thread cut by the chasers, spring means operatively interposed independently of the adjustable part of the slide structure between the tool body and the slidably supported part of said slide structure and effective during the thread-cutting operation to aid the receding movement of the chasers, and means for actuating the slide structure synchronously with the feed movement of the apparatus.

19. Apparatus as claimed in claim 18 in which the means for actuating the slide structure comprises work-engaging means movably supported within the tool body and operatively connected to move the slide structure.

20. In thread-cutting apparatus of the receding cutter type, the combination of a hollow spindle; means supporting the spindle for rotation about its longitudinal axis and holding it against axial movement relative to the supporting means, the said supporting means comprising bearings engaging the spindle at points spaced apart axially thereof with one of the bearings adjacent the front end of the spindle; thread-forming cutters mounted on the front end of the spindle for movement toward and away from the spindle axis; and a slide structure supported from an inner surface of the spindle for movement parallel to the spindle axis and operatively connected to the cutters to effect by its movement the said movement of the cutters.

21. In thread-cutting apparatus of the receding cutter type, the combination of a hollow spindle having a plurality of lateral openings through its side wall adjacent its front end; means supporting the spindle for rotation about its longitudinal axis and holding it against axial movement relative to the supporting means, the said supporting means comprising bearings engaging the spindle at points spaced apart axially thereof with one of the bearings immediately to the rear of the spindle side openings; thread-forming cutters mounted on the front end of the spindle for movement toward and away from the spindle axis; and a slide structure supported from an inner surface of the spindle for movement lengthwise thereof and having a front part surrounding the cutters and rigidly connected through the side openings of the spindle to the part of the slide structure disposed inside of the spindle, the slide structure having its front part operatively connected to the cutters to effect by its movement the said movement of the cutters.

22. In thread-cutting apparatus of the receding cutter type, the combination of a hollow spindle having a plurality of lateral openings through its side wall adjacent its front end; means supporting the spindle for rotation about its longitudinal axis and holding it against axial movement relative to the supporting means, the said supporting means comprising bearings engaging the spindle at points spaced apart axially thereof with one of the bearings immediately to the rear of the spindle side openings; thread-forming cutters mounted on the front end of the spindle for movement toward and away from the spindle axis; and means for controlling receding movement of the cutters relative to a work piece comprising two slide structures operatively interconnected and supported from an inner surface of the spindle for movement lengthwise thereof, one of said slide structures having a front part disposed radially inside the cutters and the other slide structure having a front part disposed radially outside of the cutters and rigidly connected through the side openings of the spindle to the rear part of the same slide structure disposed inside the spindle, one of the said front parts being formed to engage the end of a work piece presented to the cutters and the other front part being operatively connected to the cutters.

WILLIAM L. BENNINGHOFF.
ALEXANDER F. ROBERTSON.

(References on following page)

REFERENCES CITED

The following references are of record in the file of this patent:

UNITED STATES PATENTS

| Number | Name | Date |
|---|---|---|
| 411,579 | French | June 20, 1910 |
| 1,040,583 | Saunders | Oct. 8, 1912 |
| 1,299,883 | Warren | Apr. 8, 1919 |
| 1,456,805 | Koontz | May 29, 1923 |
| 2,054,028 | Benninghoff | Sept. 8, 1936 |
| 2,054,029 | Benninghoff | Sept. 8, 1936 |
| 2,067,626 | Benninghoff | Jan. 12, 1937 |
| 2,100,449 | Neill | Nov. 30, 1937 |
| 2,146,583 | Kylin | Feb. 7, 1939 |
| 2,183,514 | Granberg et al. | Dec. 12, 1939 |
| 2,215,270 | Mathias | Sept. 17, 1940 |
| 2,237,466 | Zimmermann | Apr. 8, 1941 |
| 2,244,925 | Tyne | June 10, 1941 |
| 2,246,237 | Benninghoff | June 17, 1941 |
| 2,249,758 | Goldberg | July 22, 1941 |
| 2,265,764 | Robertson | Dec. 9, 1941 |
| 2,291,744 | Nell | Aug. 4, 1942 |
| 2,318,177 | Mathias | May 4, 1943 |
| 2,324,879 | Robertson | July 20, 1943 |

FOREIGN PATENTS

| Number | Country | Date |
|---|---|---|
| 146,095 | Great Britain | Feb. 3, 1921 |
| 17,048 | Great Britain | Dec. 11, 1913 |